United States Patent [19]

Smith et al.

[11] Patent Number: 5,606,681
[45] Date of Patent: Feb. 25, 1997

[54] METHOD AND DEVICE IMPLEMENTING SOFTWARE VIRTUAL DISK IN COMPUTER RAM THAT USES A CACHE OF IRPS TO INCREASE SYSTEM PERFORMANCE

[75] Inventors: Peter Smith, Llanelly Hill, United Kingdom; Eric S. Dickman, Newton, Mass.; Ian Percival, Ilminster, United Kingdom

[73] Assignee: EEC Systems, Inc., Sudbury, Mass.

[21] Appl. No.: 205,287

[22] Filed: Mar. 2, 1994

[51] Int. Cl.$^6$ .............................. G06F 13/14; G06F 12/08
[52] U.S. Cl. .................. 395/413; 364/232.1; 364/256.3; 364/DIG. 1; 395/200.07; 395/427; 395/431; 395/825; 395/445
[58] Field of Search ..................................... 395/250, 575, 395/425, 872, 650, 821, 825, 200.07, 406, 410; 340/172.5; 364/238.4, 232.1

[56] References Cited

U.S. PATENT DOCUMENTS

| | | | |
|---|---|---|---|
| 3,820,078 | 6/1974 | Curley et al. ............................ | 395/250 |
| 4,701,848 | 10/1987 | Clyde ...................................... | 395/650 |
| 4,763,333 | 8/1988 | Byrd ........................................ | 371/66 |
| 4,849,879 | 11/1989 | Chinnaswamy et al. ................ | 395/600 |
| 5,063,499 | 11/1991 | Garber .................................... | 395/500 |
| 5,091,846 | 2/1992 | Sachs et al. ............................. | 395/250 |
| 5,241,508 | 8/1993 | Berenguel et al. ..................... | 365/229 |
| 5,347,648 | 9/1994 | Stamm et al. ..................... | 395/182.03 |
| 5,353,430 | 10/1994 | Lautzenheiser .......................... | 395/444 |
| 5,359,713 | 10/1994 | Moran et al. ............................ | 395/872 |

FOREIGN PATENT DOCUMENTS

| | | |
|---|---|---|
| 1-36351 | 2/1989 | Japan . |

OTHER PUBLICATIONS

Bruce Ellis, "VMS Internals: RWASTed again?", Digital Systems Journal, Nov.–Dec. 1992, v14 n6 p50(5) Nov. 1992.
I/O Express User's Guide, EEC Systems Incorporated Jun. 1, 1990.
Turbocache/Turbodisk Software Product Description, EEC Systems Incorporated, Revised: Feb. 24, 1992.
David Simpson, "Alpha I/O Caching software will lag Open VMS AXP", Digital News & Review, v9, n22 p3(1) Nov. 23, 1992.
Ted Smalley Bowen, "EEC ups ante in VMS disk caching arena with three-tiered package for EEC VAXclusters", Digital Review, v9 n6, p6(1) Mar. 16, 1992.
Keith Walls, "The real cost of OpenVMS I/O", Digital News & Review, v10 n5 p34(1) Mar. 1, 1993.

(List continued on next page.)

*Primary Examiner*—Thomas G. Black
*Assistant Examiner*—Greta L. Robinson
*Attorney, Agent, or Firm*—Bromberg & Sunstein

[57] ABSTRACT

Virtual disks are created in RAM having the characteristics of either a write through unit, a write deferred unit, or a repeat save interval unit, which identifies the mode of operation the virtual disk uses in the backup of its RAM data to a backing disk drive. A unit identified as a write through unit proceeds by writing the write I/O data to the virtual disk in RAM and immediately to the backing disk drive. A write through unit does not signal completion of a write I/O data until the data has been written to both the virtual disk in RAM and the backing disk drive. A unit identified as a write deferred unit proceeds by writing the write I/O data to the virtual disk in RAM and immediately from the RAM to the backing disk drive. A write deferred unit will signal completion of a write I/O data to the virtual disk in RAM only and does not wait for the backing disk write to complete. Write deferred units use an IRP held in a cache to clone the I/O data packet with the data source directed from the virtual disk data in RAM, sending this cloned I/O data packet IRP to the backing disk drive. A repeat save interval unit proceeds without backing up the write I/O data immediately to the backing disk and will only write the I/O data to the virtual disk in RAM. A repeat save interval unit employs a timer and when this timer expires on an adjustable interval, a complete save of the contents of the virtual disk in RAM is made to the backing disk drive.

19 Claims, 38 Drawing Sheets

OTHER PUBLICATIONS

"Turbo Disk/VMS–Virtual Memory Driver–User's Guide", Joseph R. Worrall, No date.

"Creating a Virtual Memory Manager to Handle More Data in Your Applications", Marc Adler, Microsoft Systems Journal, May, 1989.

"Analyzing Your Ramdisk Needs", Tom Kihlken, PC Magazine, May 17, 1988.

"Turbo Disk/VMS—Virtual Memory Driver—User's Guide", No date.

Turbocache™/Turbodisk™ Software Product Description, EEC Systems, Incorporated, Revised Feb. 24, 1992.

Turbocache™/Turbodisk™ Quick Start Guide, EEC Systems Incorporated, Feb. 24, 1992.

Turbocache™ Software Product Description, EEC Systems, Incorporated, Revised: Feb. 24, 1992.

Turbocache™/Turbodisk™, Cover Letter and Release Notes (*read me first*), EEC Systems, Incorporated, Feb. 24, 1992.

Turbocache™/Turbodisk™ Software Installation and User's Guide, EEC Systems Incorporated, Feb. 24, 1992.

SETUNIT user code:

VM driver code:

VM driver code:

VM driver code:

VM driver code:

VM driver code:

VM driver code:

VM driver code:

VM driver code:

VM driver code:

VM driver code:

VM driver code:

SETUNIT user code:

VM driver code:

VM driver code:

VM driver code:

METHOD AND DEVICE IMPLEMENTING SOFTWARE VIRTUAL DISK IN COMPUTER RAM THAT USES A CACHE OF IRPS TO INCREASE SYSTEM PERFORMANCE

BACKGROUND OF THE INVENTION

The present invention is directed to a software virtual disk, often referred to as a RAMdisk, in particular, a RAMdisk for use on an OpenVMS operating system.

Computer users are always looking for ways to speed up operations on their computers. One source of the drag on computer speed is the time it takes to conduct an input/output operation to the hard disk drive or other mechanical disk devices. Such devices are slowed by mechanical movement latencies and I/O bus traffic requirements. One conventional method for avoiding this speed delay is to create a RAMdisk. The computer will treat the RAMdisk as if it were a hard disk drive. Access to a RAMdisk is much quicker than writing or reading to a hard disk drive. The RAMdisk is memory resident in the computer RAM. Thus read and write access speed to a hard disk drive is replaced by main memory access speed to a RAMdisk.

There is a significant down side to the use of a RAMdisk. If the computer system should crash or be powered off, all information in the RAMdisk will be lost. Therefore, users of a RAMdisk must be extra careful to copy these files back to a hard disk at reasonable frequent intervals and must without fail copy the contents of the RAM disk at the completion of any session. It is an object of the present invention to reduce this down side risk of using a RAMdisk.

SUMMARY OF THE INVENTION

In accordance with one embodiment of the invention, a virtual disk is created in RAM and is designated as a write through unit. Thereafter, when performing I/O writes of data to the virtual disk in RAM, the write data is also written to a backing disk such as a hard drive. The write data control information is cloned to form a cloned I/O data packet which is sent to the backing disk. Completion of the I/O write is signalled upon completion of the write into the virtual disk in RAM and the write to the backing disk. In accordance with this embodiment of the invention, a write operation takes as long as an ordinary write to hard disk. An I/O read data operation is significantly accelerated because the read data is accessed through the virtual disk in RAM without resort to the hard disk.

In accordance with another embodiment of the invention, a virtual disk created in RAM can be designated as a write deferred unit. Thereafter, when performing I/O writes the data is written to the virtual disk in RAM. The write data control information is cloned to form a cloned I/O data packet that is sent to the backing disk, directing the backing disk to obtain the data from the written area in the virtual disk in RAM. Completion of the I/O write data operation is signalled upon completion of writing the data into the virtual disk in RAM. Writing of the cloned I/O data packet to a backing disk may proceed thereafter without delaying subsequent computer operations. Writing data in this method is quicker than the first method described above. However, in the case of a crash, or power outage, the hard drive may be several write data operations behind and therefore the results of the most recent write operations may be lost in such a situation.

In accordance with a still further embodiment of the invention, a virtual disk is created in RAM and marked as a repeat save interval unit. I/O writes of data to this virtual disk in RAM are performed only to the virtual disk in RAM. A timer counts out a time interval. The present preferred embodiment of the invention uses a timer within the OpenVMS operating system for this interval. At the completion of each timed interval, the entire contents of the virtual disk are stored to a backing disk. This is the fastest of the methods of the invention for accomplishing I/O writes. However, the data is significantly more volatile. The amount of data that may be lost in a crash, or power outage, depends on the last time the save was performed for a virtual disk of this type.

The present invention may be implemented on a computer that may use any or all of the above-described embodiments of the invention to create a variety of virtual disks. A disk device created by the invention may extend over RAM and hard disk so as to include a portion that is a virtual disk and a portion that is located in a physical disk. The type of virtual disk chosen for creation would depend upon the user's needs vis-a-vis speed and integrity of data. Thus the present invention may be flexibly adapted to a user's needs.

Other objects and advantages of the invention will become apparent during the following description of the presently preferred embodiments of the invention taken in conjunction with the drawing.

BRIEF DESCRIPTION OF THE DRAWINGS

FIGS. 2a–2c are flow diagrams of the program steps for creating a virtual disk of the invention.

FIGS. 7a–7c are a flow diagram of the program steps for restoring a virtual disk of the invention after a system shut down.

DETAILED DESCRIPTION OF THE PREFERRED EMBODIMENTS

Figure 1A:
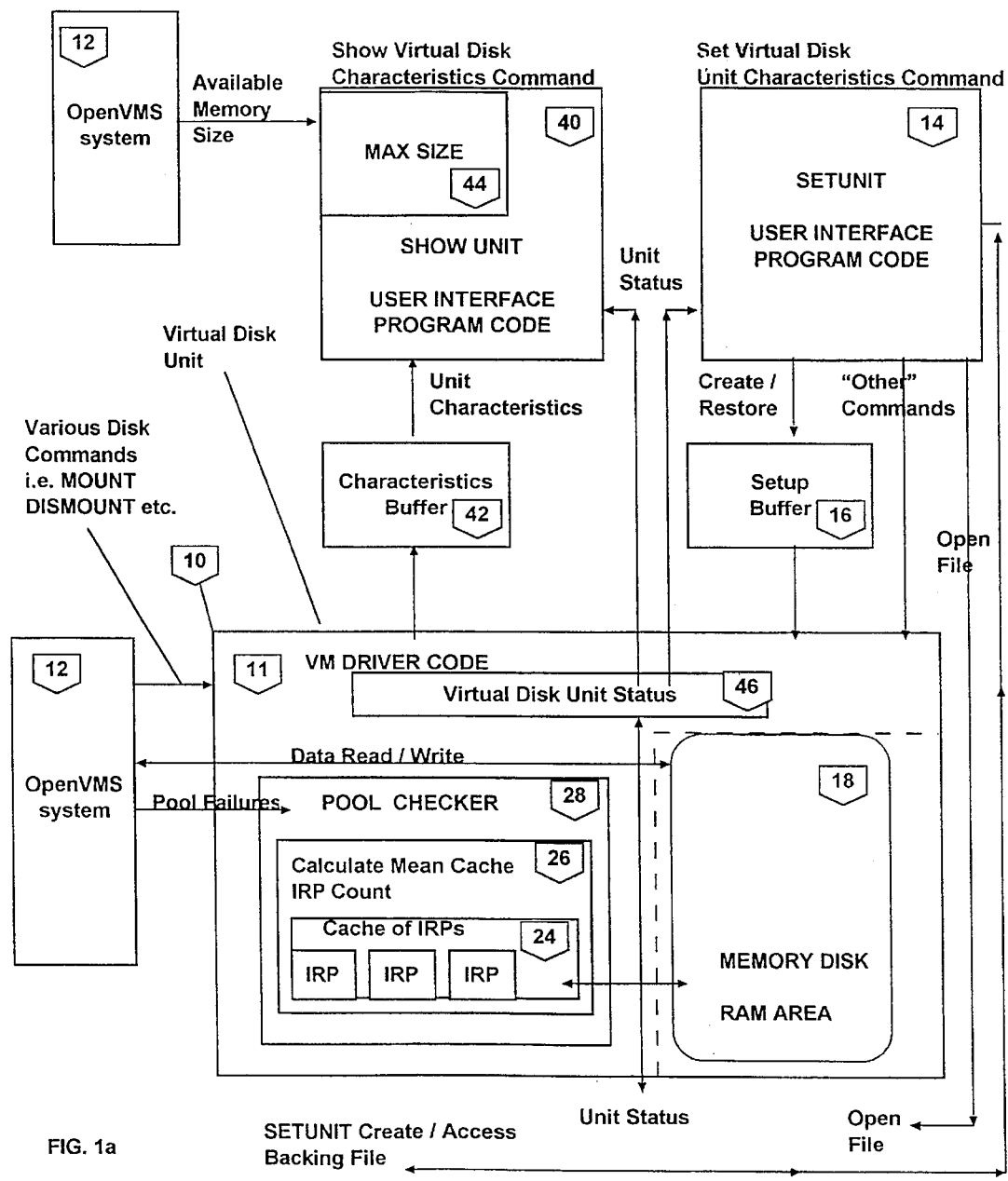
FIG. 1 is a schematic block diagram of a virtual disk of the invention implemented on a computer running an OpenVMS operating system.
Figure 1B:
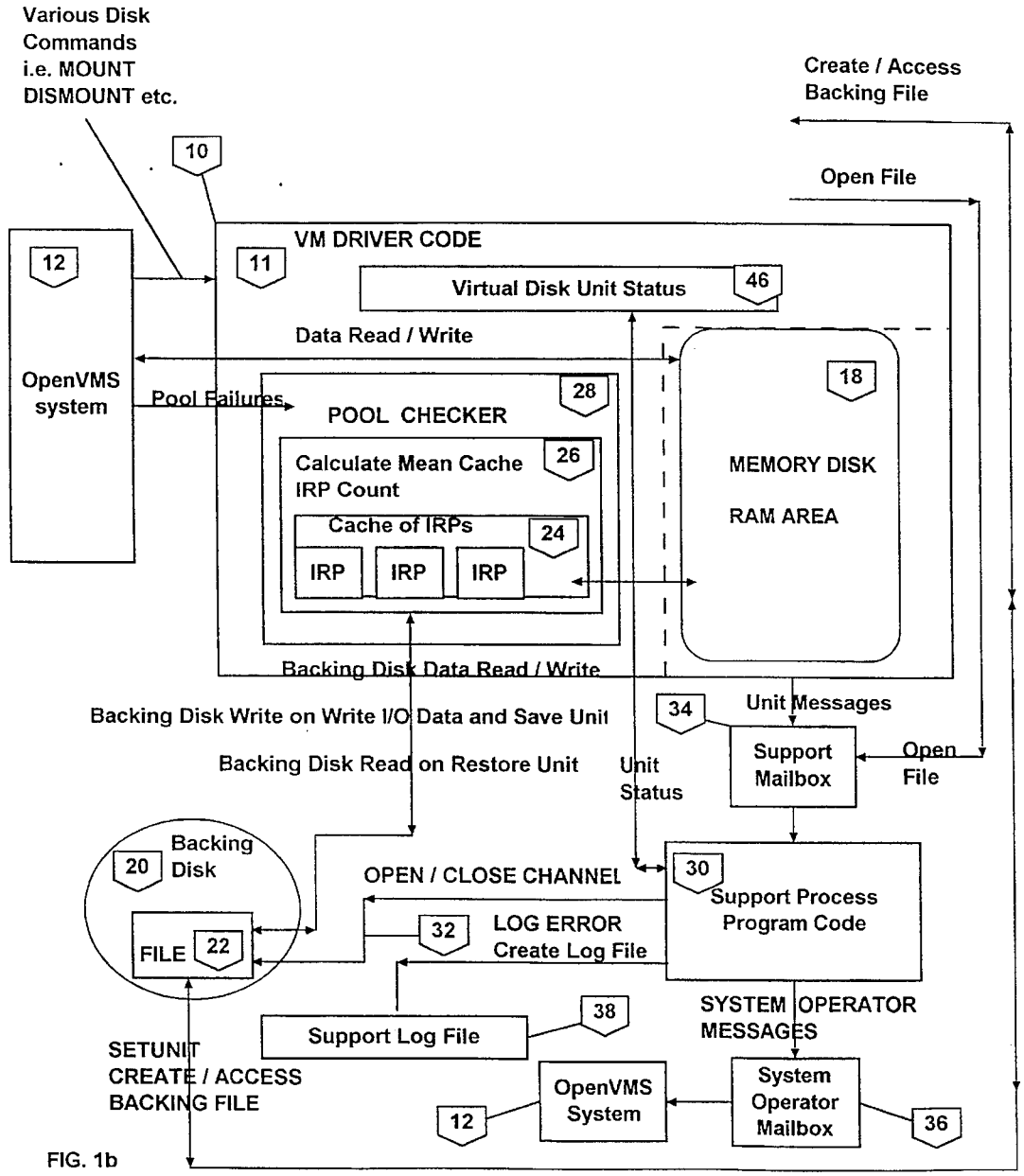
Figures 1, 2A:
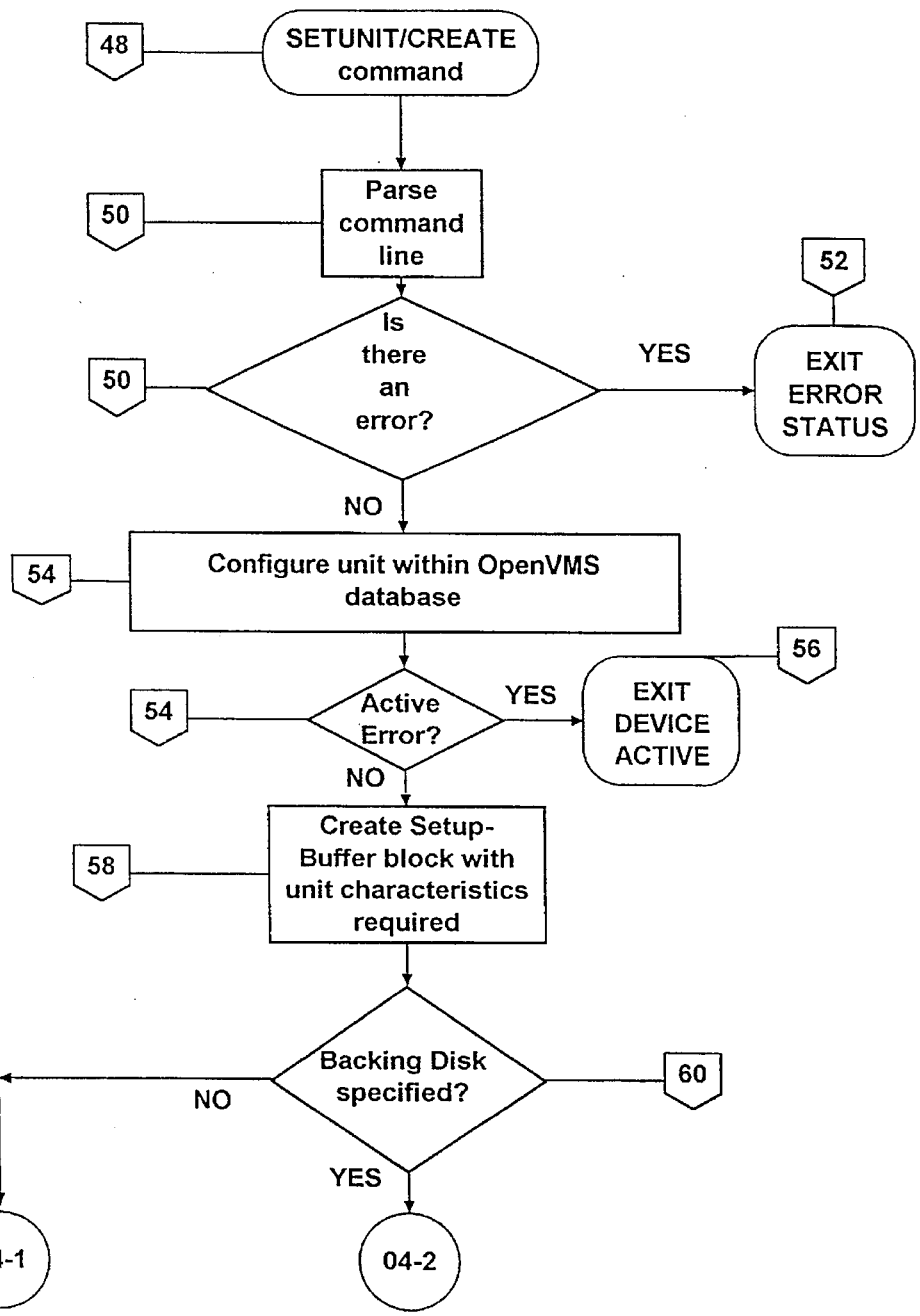
Figures 2, 2A:
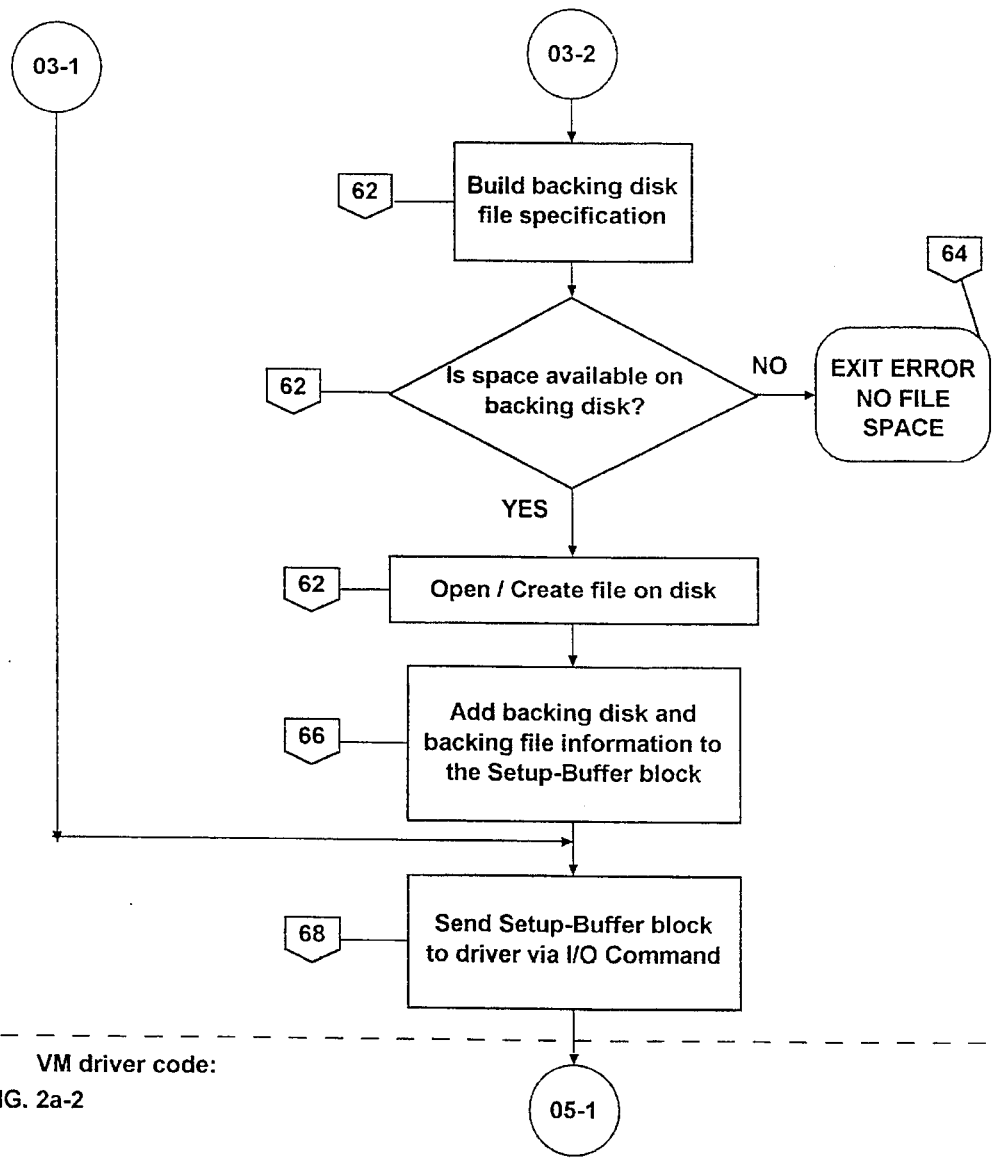
Figures 2, 2A, 3:
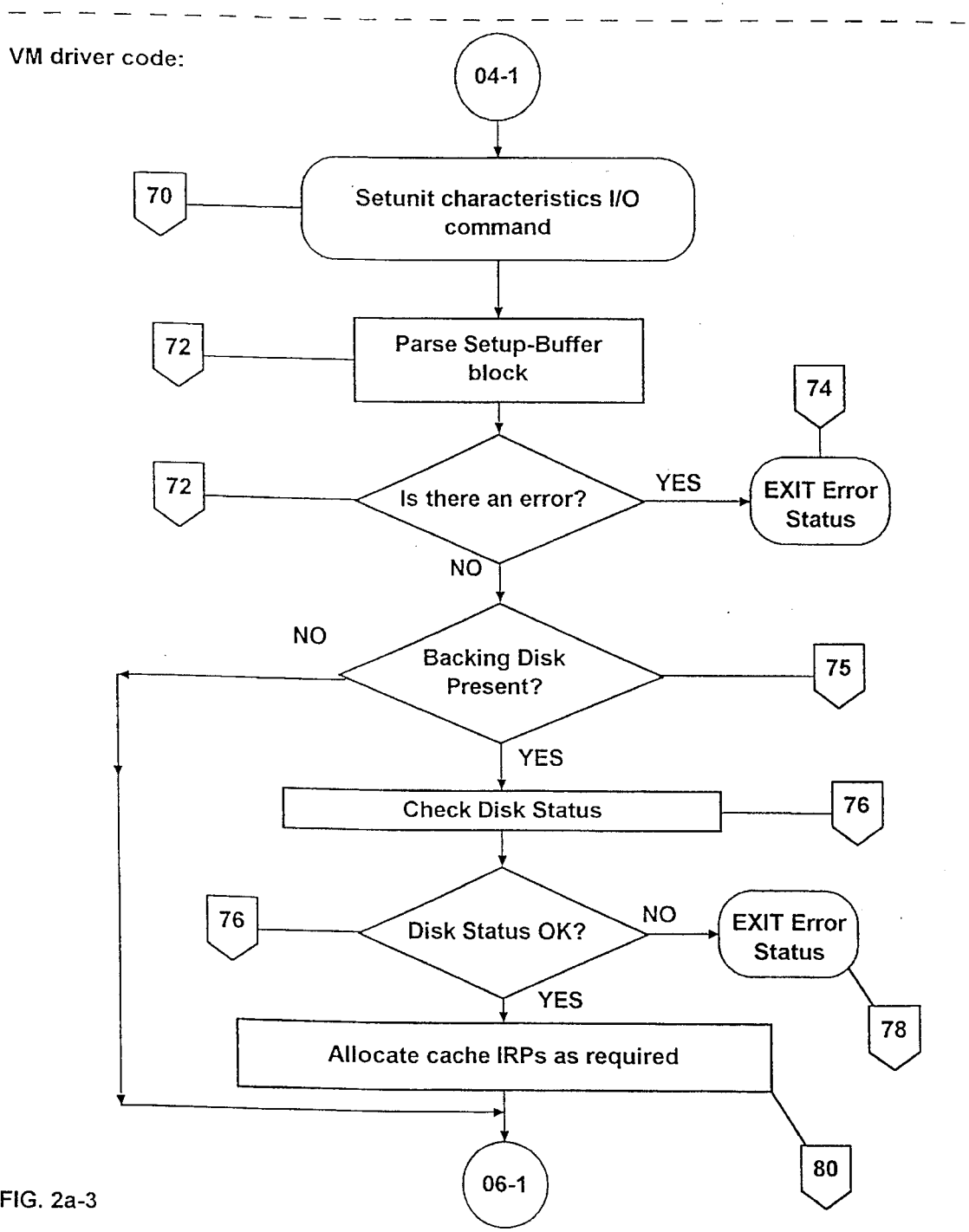

Referring now to the drawings, a virtual disk (10) of the present invention is schematically shown in FIG. 1. The virtual disk (10) is resident in RAM. The virtual disk (10) is accessed by the operating system of the associated computer just as any other hard disk drive operated by the computer. The operating system may be any commonly available system, however, the presently preferred embodiment of the invention is implemented in conjunction with an OpenVMS system (12). The OpenVMS system (12) is documented in Goldenberg, Ruth E. et al., *VAX/VMS Internals and Data Structures: version* 5.2, published by Digital Press, ISBN:

1-55558-059-9; *OpenVMS VAX Device Support Manual,* Order No. AA-PWC8A-TE and *OpenVMS VAX Device Support Reference Manual,* Order No. AA-PWC9A-TE, the disclosures of which are all hereby incorporated by reference herein. The manuals can be obtained from Digital Equipment Corporation, P.O. Box CS2008, Nashua, N.H. 03061. Accesses to disks through the system are performed by the VM driver (11). If a virtual disk is desired that requires more memory than is readily available in RAM, the virtual disk can be made to span a memory portion in RAM and a memory portion on a hard disk drive.

In order to create a virtual disk (10) of the invention, a user command interface (14) is provided. In the presently preferred embodiment, this is accessed via a SETUNIT command. The SETUNIT commands include the commands for creating, restoring, or modifying, a virtual disk (10). A set-up buffer (16) is formed whenever a virtual disk (10) is created or restored. The set-up buffer (16) contains the required characteristics that the virtual disk (10) will possess. The set-up buffer (16) is allocated from the computer memory and passed to the VM driver (11) for the virtual disk (10) creation or restoration. Once the set-up buffer (16) has been used the computer memory area it occupied is returned back to the system. The virtual disk (10) itself contains a memory disk area (18) in which I/O data can be written to or read from. The invention permits the memory disk area (18) to be restored from a backing file (22) after a system shut down and re-boot.

The present invention provides three methods of backing up the memory disk area (18) by storing copies of the data in a backing file (22) on a backing disk (20). The particular method in which a memory disk area (18) is backed up depends on how the virtual disk (10) has been set up. The characteristics passed via the set-up buffer (16) to the VM driver (11) identify the virtual disk (10) as requiring to be a write through unit, a write deferred unit, or a repeat save interval unit. In order to provide more ease of write access to the backing disk (20) on an OpenVMS system, the virtual disk (10) provides a cache for IRPs (24), to alleviate the access load on the OpenVMS system (12) pool. These IRPs in the cache (24) are originally obtained from the OpenVMS system (12) pool, and the initial amount to obtain when the virtual disk (10) is created, or restored, can be specified through the set-up buffer (16). The virtual disk (10) will obtain extra IRPs from the OpenVMS system (12) pool and place them in its cache (24) if in an I/O write to the virtual disk (10), all the current IRPs in its cache (24) are in use. The virtual disk (10) includes a program for calculating the mean IRP availability (26), thus the virtual disk (10) can avoid hoarding extra unneeded IRPs in its cache (24). Also, an OpenVMS system pool checker (28) is included in the virtual disk (10) to make sure that the OpenVMS system (12) is not suffering with its own lack of IRPs.

In order to prevent accidental removal of the disk volume containing the backing file (22) in the backing disk (20), a support code (30) is provided. The support code (30) will hold a channel open (32) to the backing file (22) whenever the virtual disk (10) is set for data access from the OpenVMS system (12). This occurs under the OpenVMS system (12) whenever the virtual disk (10) is created, or restored, when the virtual disk (10) volume is initialized, and when the virtual disk (10) volume is mounted for access. The open channel (32) from the support code (30) will close whenever the virtual disk (10) volume is dismounted from access or when the virtual disk (10) is dissolved. The support code (30) responds to messages from the virtual disk (10), and the open file request message from the SETUNIT user interface (14), placed in the support codes mailbox (34). The open message from the SETUNIT user interface (14) causes the support code (30) to open the channel (32) on the backing file (22). The equivalent open message, along with a corresponding close channel request message, comes from the virtual disk (10) when it is set, and removed from, access from the OpenVMS system (12). The virtual disk (10) can also send error and warning messages via the support mailbox (34) to the support code (30). The support code (30) responds to these messages from the virtual disk (10) by recording them within its log file (38), as well as sending the messages onto the OpenVMS system (12) via its operator mailbox (36).

In order to provide an extra capability to display virtual disk (10) characteristics, apart from the normal OpenVMS show device commands, a "show unit" user interface (40) is supplied. In the presently preferred embodiment, a user can display various information about the virtual disk (10) by use of the show unit commands. The show unit (40) interface obtains information from the virtual disk (10) directly from its unit status (46) as well as via a characteristics buffer (42). The characteristics buffer (42) is used when a large amount of information is required from the virtual disk (10). The characteristics buffer (42) is allocated from the computer memory and the virtual disk (10) is requested to write the required information into the buffer. Once the show unit (40) program has displayed all the information from the characteristics buffer (42) to the user, the memory occupied by the characteristics buffer (42) is returned to the system. In order to facilitate the creation of a virtual disk (10) the show unit (40) interface contains a program (44) for determining the maximum size that the memory disk area (18) of a virtual disk (10) can be.

The VM driver (11) maintains most of a virtual disk (10) current status in a unit status field (46). The show unit (40) program accesses this in displaying certain characteristics of a virtual disk (10). The SETUNIT (14) program accesses the unit status (46) when creating, or restoring, a virtual disk (10). The support code (30) accesses the unit status (46) when it is opening and closing its channel (32) to the backing file (22), in order to form a simple backing file (22) status communication between the support code (30) and the virtual disk (10).

Figures 1, 2B:
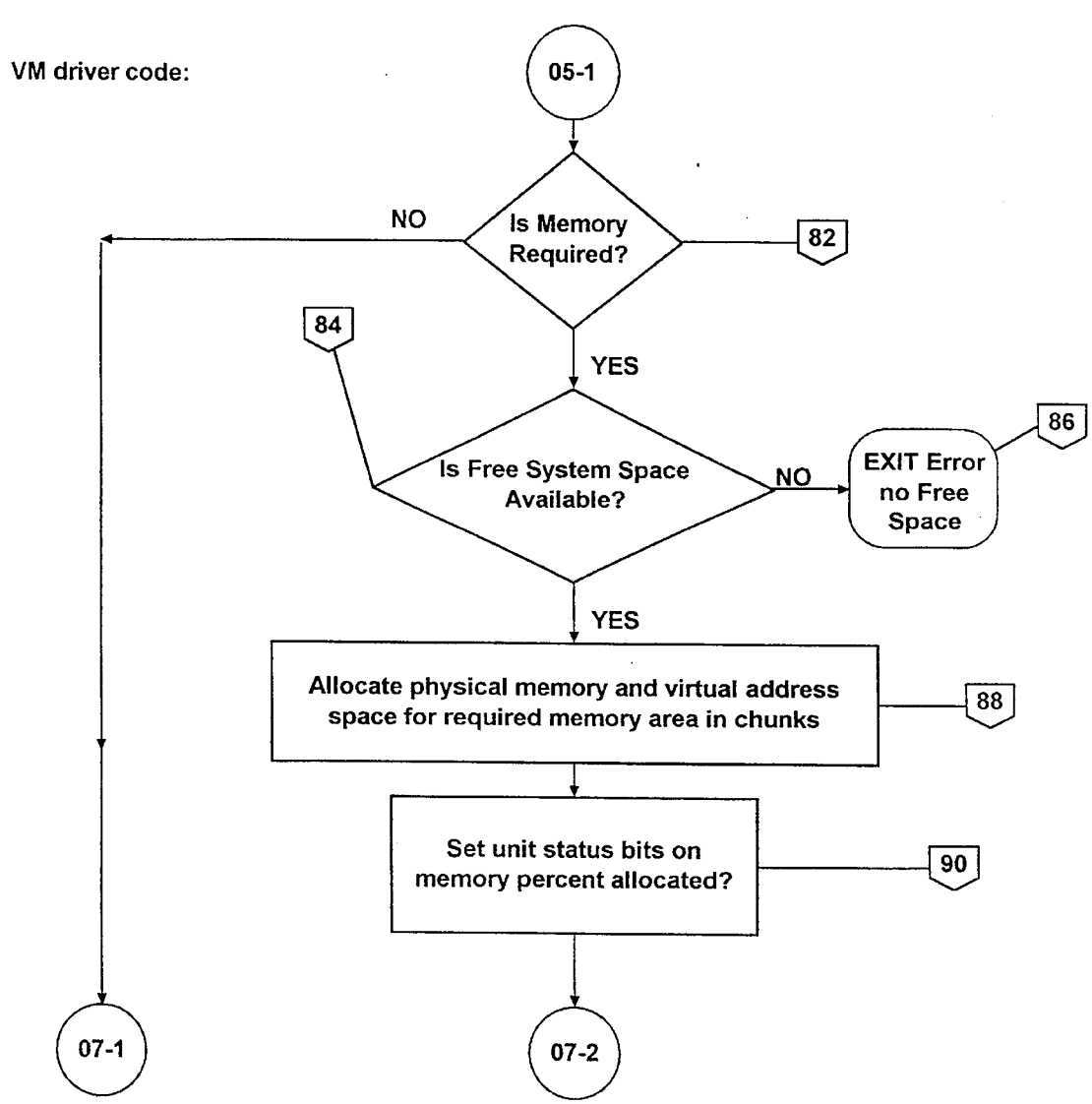
Figures 2, 2B:
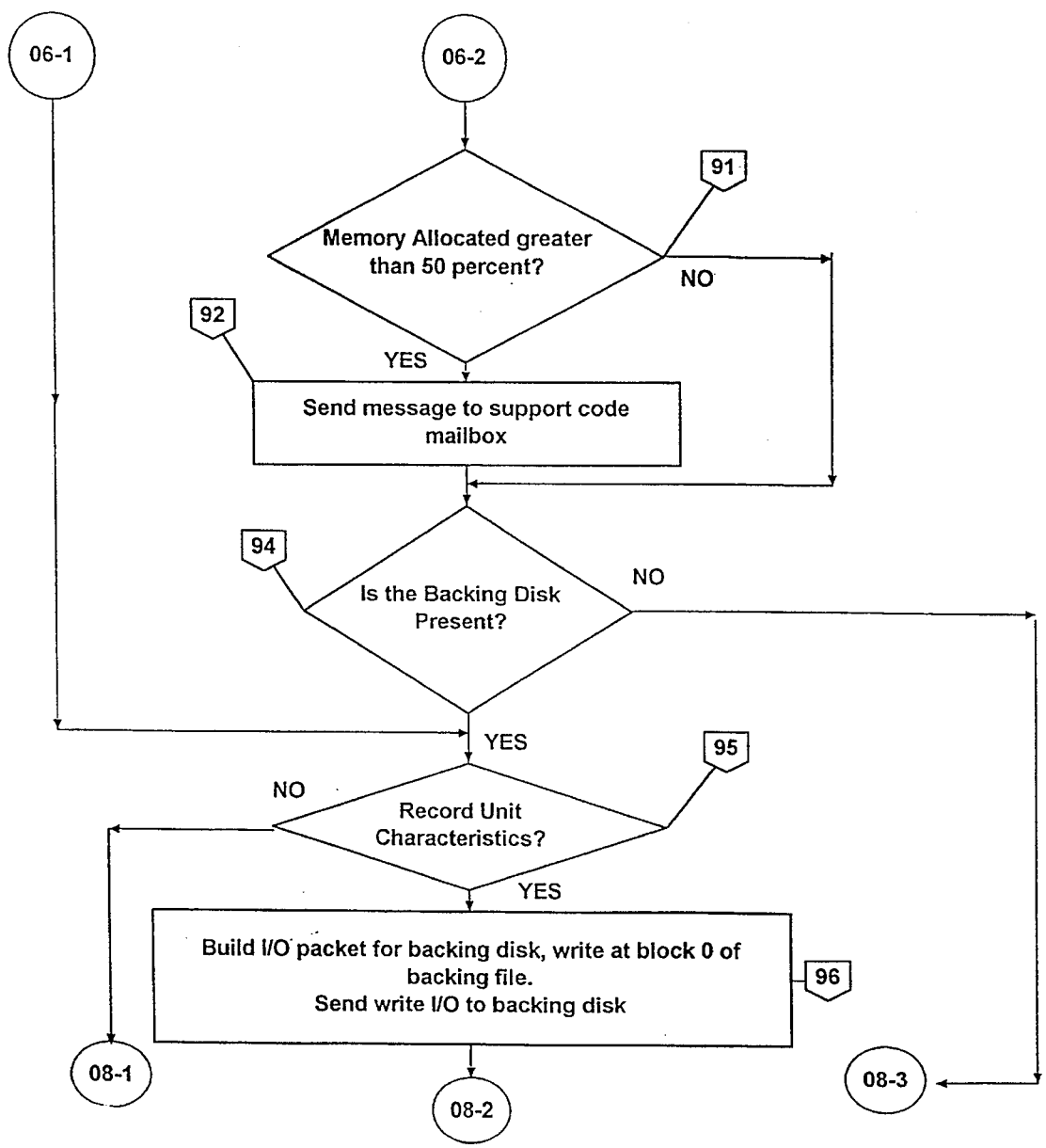
Figures 2, 2B, 3:
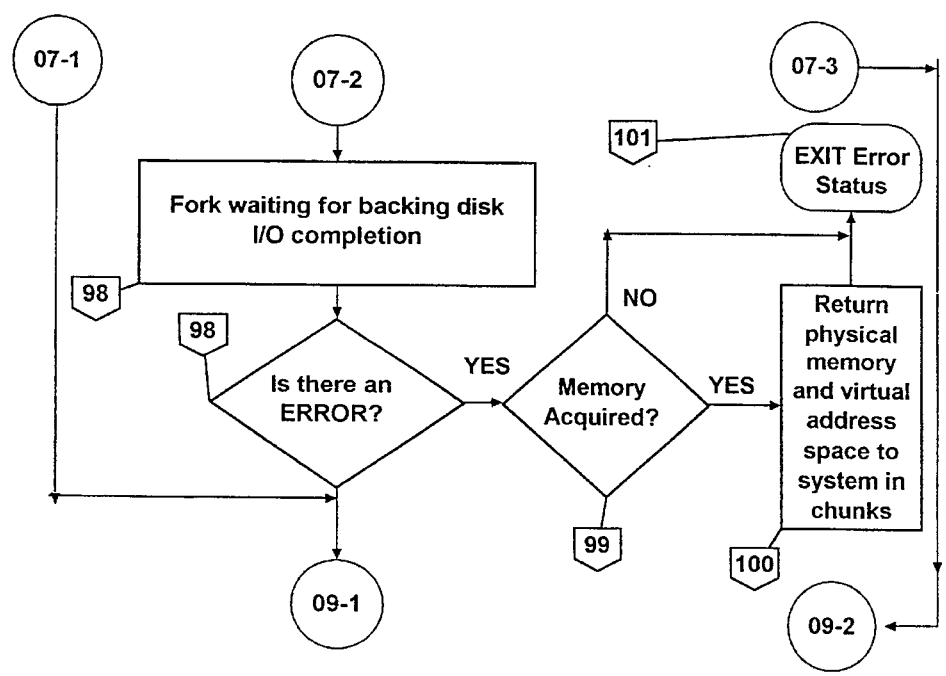

Referring now to FIGS. 2a–2c, the instruction flow for carrying out a create command is illustrated. A create command (48) will specify the size of the virtual disk and the type of backup to be applied to the disk. The input instruction is first parsed (50). An error in the syntax or in making an impossible request as to the size of the disk or access to the disk, results in an error (52) and no further processing is performed in response to the erroneous command. The create command also specifies a name for the virtual disk. The named unit is configured (54) within the operating system database. If the unit already exists an error is issued (56). The type, size and availability of the virtual disk are incorporated into a set-up buffer (16, FIG. 1) so as to create (58) the set-up buffer block.

The present invention relates to the use of a backing disk in conjunction with the virtual disk. If a backing disk is not specified by the create command, an unprotected virtual disk will be set up without the benefit of the invention. In accordance with the invention, when a backing disk is specified (60), a file is built (62) in the backing disk for storing a backup to the virtual disk memory area. If there is inadequate space on the backing disk to accommodate such a file, an error (64) is issued. The identification of the backing file and backing disk are incorporated into the set-up buffer block (66). To this point, the instructions for the create command have been performed by the user interface SETUNIT command program (14, FIG. 1) and have had a low priority on the processor. At this point, the set-up buffer block (16, FIG. 1) is passed (68) onto the VM device driver (11, FIG. 1) to initiate further creation of the virtual disk, which requires a high priority system program. The receipt of the set-up buffer (16, FIG. 1) command at the VM driver level is indicated in the instruction block 70. The set-up buffer block is parsed (72) to identify any irregularities inconsistent with the realm of possibilities and designated syntax. An error halts operation (74) of the process. If the virtual disk calls for a backing disk (75) in accordance with the invention, the specified backing disk status is checked (76). If an error is detected, the program exits (78). If all is in order, IRPs are allocated (80) into the cache (22, FIG. 1). Not shown in the flow chart is an instruction that skips over the allocation of cache IRPs if the virtual disk is a repeat save interval unit. An IRP is a packet used for controlling I/O requests in the OpenVMS system, these are normally acquired from the OpenVMS system pool at the time they are needed to perform an I/O operation. By making IRPs readily available to the virtual disk, I/O operations and the associated backup can be more easily accomplished and the load on the OpenVMS system pool is reduced.

The program next determines that memory is required (82). The system is checked (84) to determine whether the required memory space is available in RAM. If not, the program exits (86) because of the inability to accommodate the virtual disk. The required memory for the disk device being created is allocated (88) in chunks. If the required memory is not too great, the virtual disk can reside entirely within RAM. It is that portion of the disk device in RAM that is volatile and can benefit from the backup methods. Status bits are set in the virtual disk unit status (46) to indicate how much RAM has been used of the available computer memory (90). If the allocation is greater than 50% of that available (91), an appropriate message (92) is sent to the support code mailbox (34, FIG. 1) in order to inform the OpenVMS system operator. When a backing disk is used (94), the process proceeds to record unit characteristics in the backing file. The recording of the characteristics is normally expected to be desired, however, the user is allowed to override this (95). The recording is done to facilitate restoring the unit after a system shut down and also to check at this point the ability of the virtual disk to write data to the backing disk. Overriding the recording will prevent the unit from being restored after a system shut down. An I/O packet is built (96) containing the unit characteristics and stored in the backing disk at block 0 of the backing file. The program waits as the write of the I/O packet into the backing disk proceeds (98). If an error occurs when attempting to record the unit characteristics in the backing file then if memory was acquired (99) it is returned (100) in chunks, and the process exits (101). If the virtual disk is specified as a repeat save interval unit (102), an OpenVMS system timer is initiated (104) for timing the repeat intervals. If the virtual disk is not a save interval unit, an OpenVMS system timer will be initiated (106) for repeatedly causing the calculation of the mean cache IRP count. A new global internal write deferred flow control limit is calculated (108). This global internal limit is shared by all virtual disks operating as write deferred units on the system and is adjusted whenever any virtual disk is created or dissolved, as system characteristics with regard to available memory have changed. Virtual disks operating as write deferred units are high consumers of computer system resources, such as cached IRPs allocated from system pool. The global limit is calculated as how many IRPs can be allocated from the current system pool reduced by a percentage. The reduction depends on the percentage of memory allocated by this virtual disk in instruction 90 block, to accommodate for pool expansion on the OpenVMS system. At this point the virtual disk is set open and initialized (110) in its unit status (46, FIG. 1). If the virtual disk unit is to be made available across a VMScluster (112) of OpenVMS systems, the clusterwide bit in the device characteristics is set (114) allowing this virtual disk unit to be found and served to a VMScluster by the OpenVMS MSCP server system. A unit available message is sent (116) to the support code mailbox (34), causing the support code to open a channel (32, FIG. 1) on the backing file. That completes the creation of the disk unit successfully (118). The OpenVMS system now considers the virtual disk as another available disk drive in which to read or write.

Reading and writing to the virtual disk will vary in accordance with the present invention depending on the type of virtual disk that has been created. FIGS. 3a–3i provide the program flow for performing a read or write when virtual disks are in use on the system. The Read Write I/O (120) program is initiated when a read or write to a created disk unit is received. If the virtual disk unit called for by the read or write has not been initialized and open (122), an error is indicated and the program exits (124). This check verifies that the virtual disk unit has been successfully created, or restored, and is ready to accept commands. If the virtual disk is assigned a backing disk (126), the program checks to make sure that the backing disk is on line and has the correct volume containing the backing disk file (128), if not an error is indicated and the program exits (130). Next the virtual disk block address range that has been called for is checked to make sure it falls within the available addresses in the disk (132). If not, an error is issued (134). The program sequence then depends upon the type of virtual disk unit into which the read or write is directed. If the unit is a virtual disk whose size entirely fits within RAM, the "all memory" program sequence (140) will be followed, with the RAM possibly backed up by a backing disk in accordance with a method of the invention. An overflow disk is one that has some of its contents in RAM and some of its contents on a physical disk. The RAM in an overflow disk is not backed up by a backing disk. A virtual memory disk has part of its contents in RAM and part of its contents on a backing disk. The RAM is backed up by a backing disk in accordance with a method of the invention. The overflow and virtual memory disk program sequence is identified by "memory and disk" (232). The present invention relates to a virtual disk with some or all of its contents resident in RAM with that data being backed up by a backing disk. The present preferred embodiment of the invention allows for a virtual disk to contain no data in RAM at all, but to be fully resident on a physical hard disk. These virtual disk units are referred to as logical disk units by the present preferred embodiment of the invention. The logical disk program sequence is identified by "all disk" (216).

Figures 1, 3A:
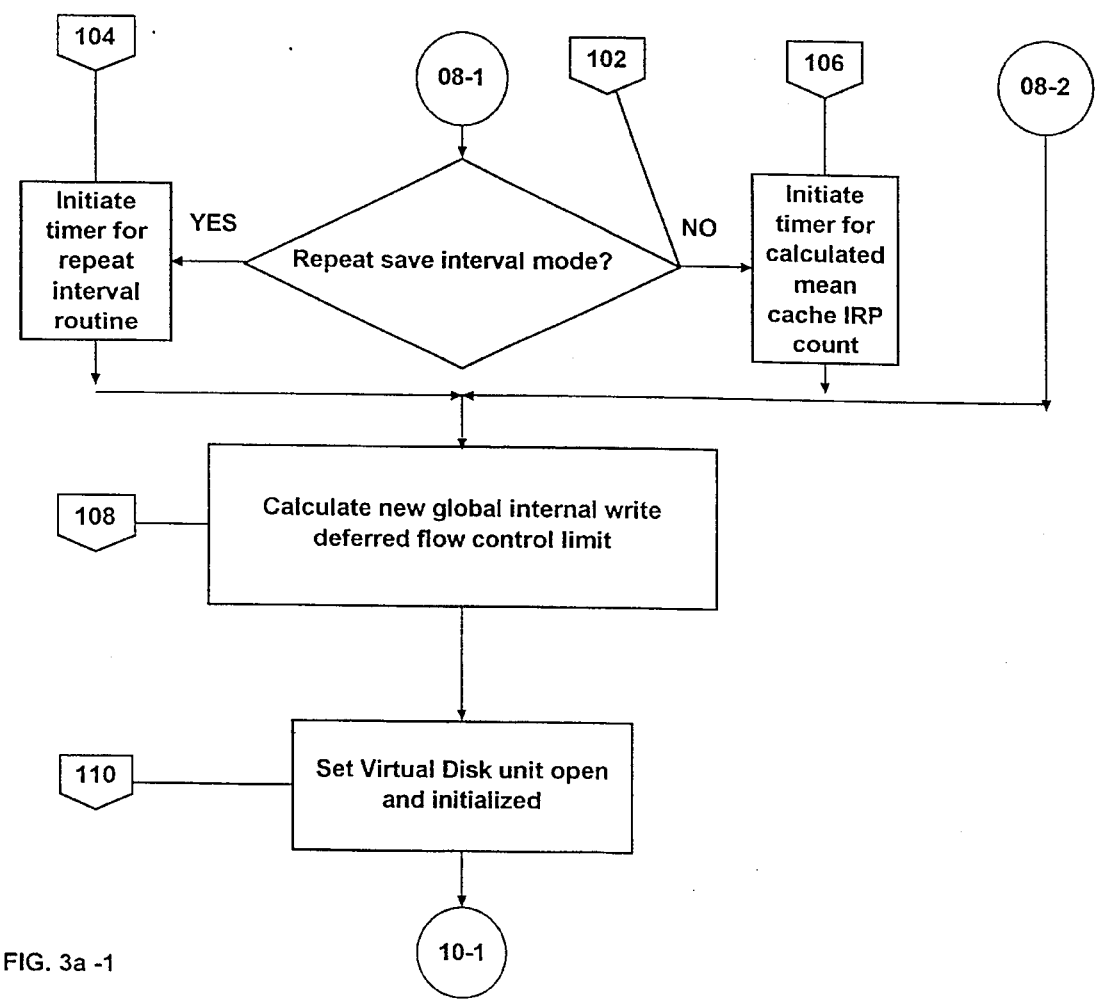
FIGS. 3a–3i are flow diagrams of the program steps for performing an I/O operation to a disk created by the present invention.
Figures 2, 3A:
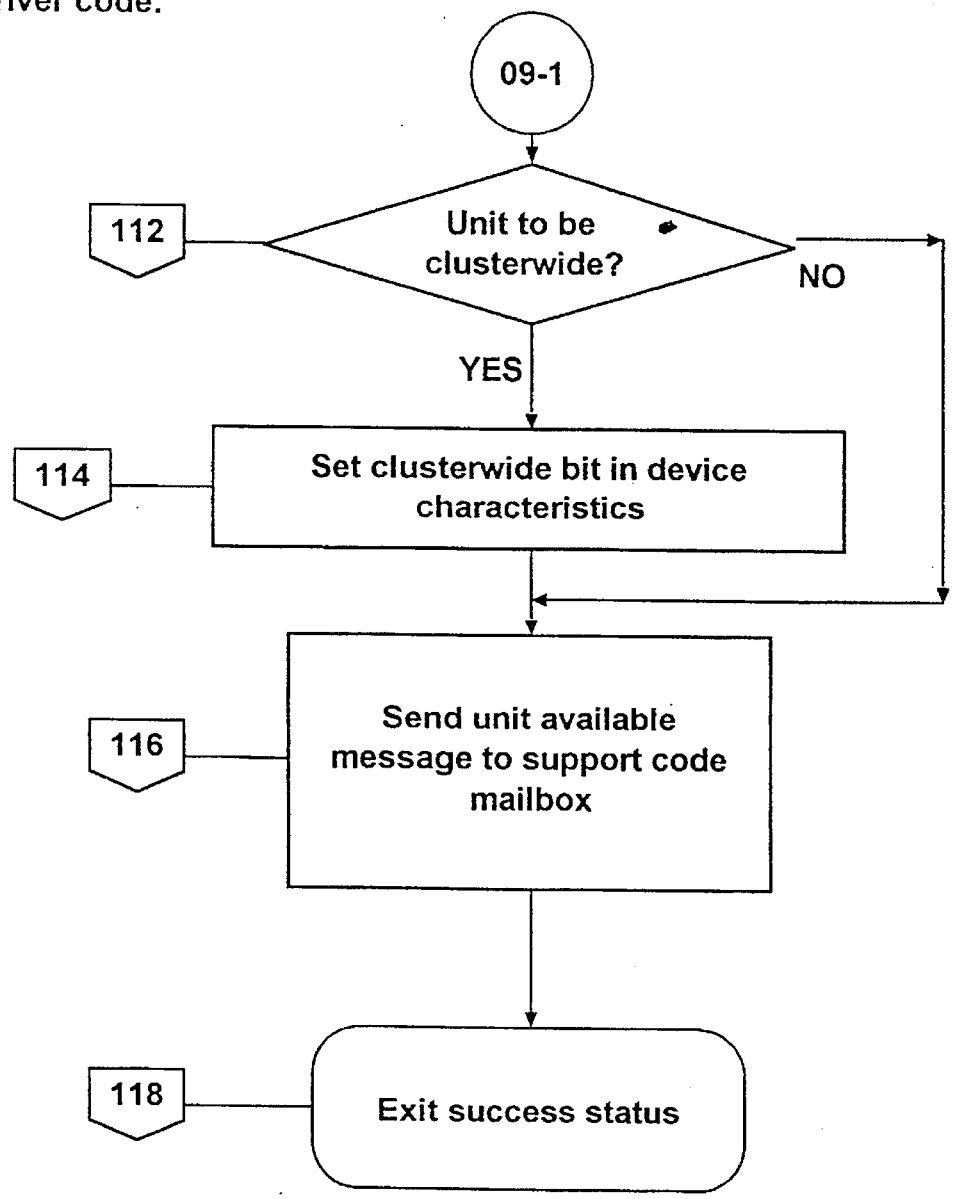
Figures 1, 3B:
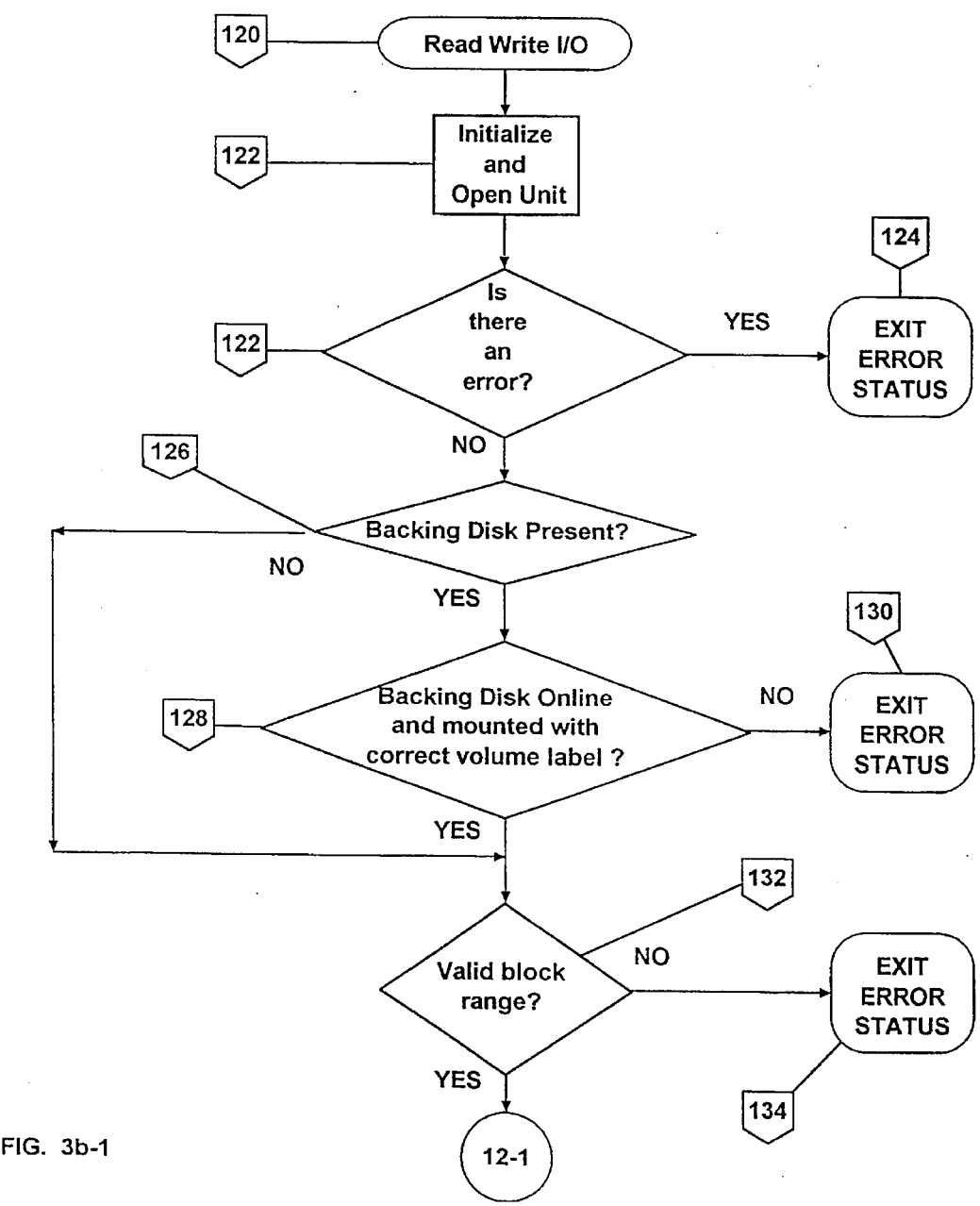
Figures 2, 3B:
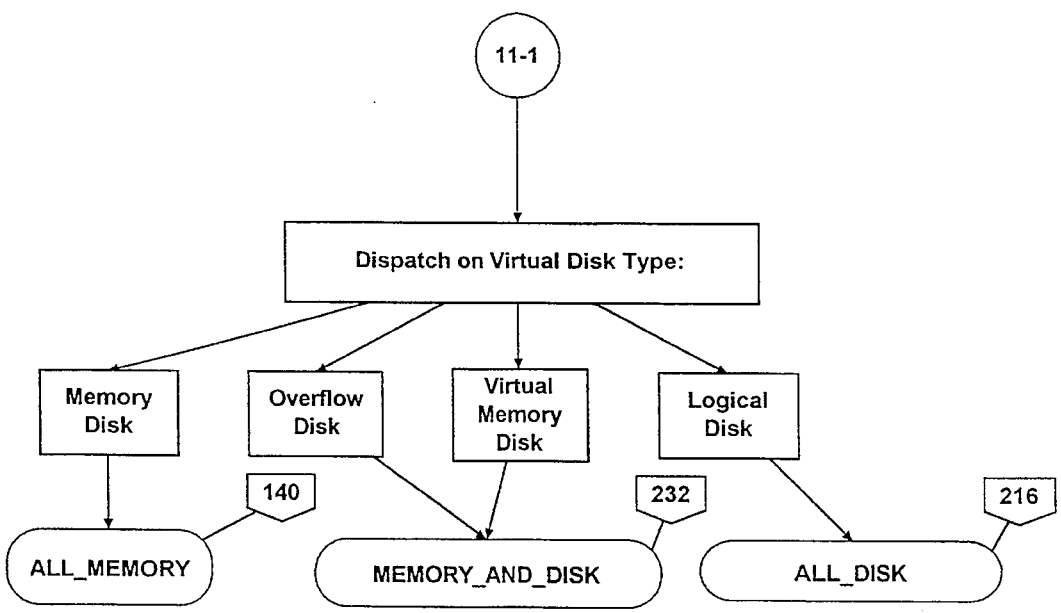
Figures 3, 3B:
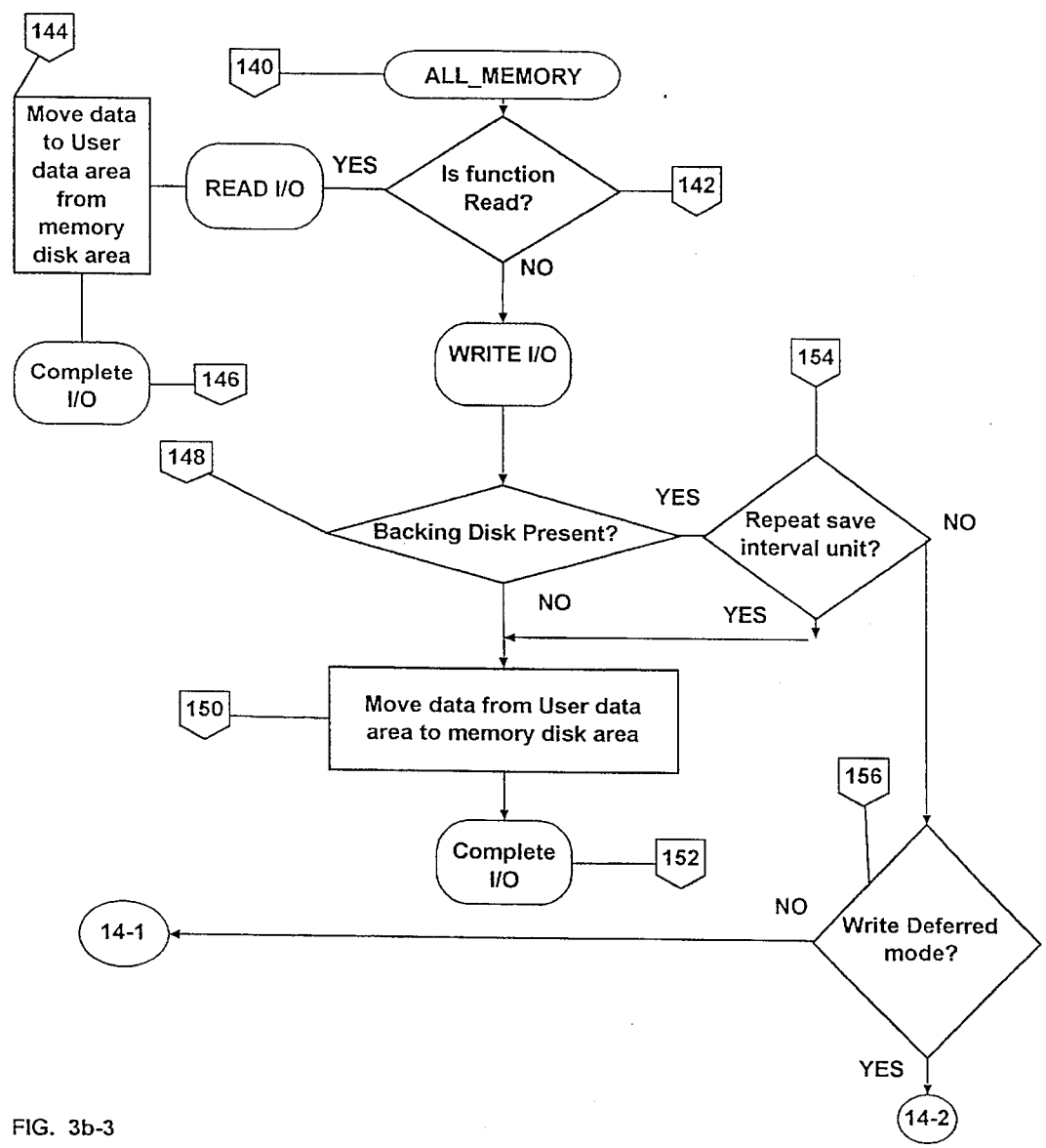
Figures 3, 3B, 4:
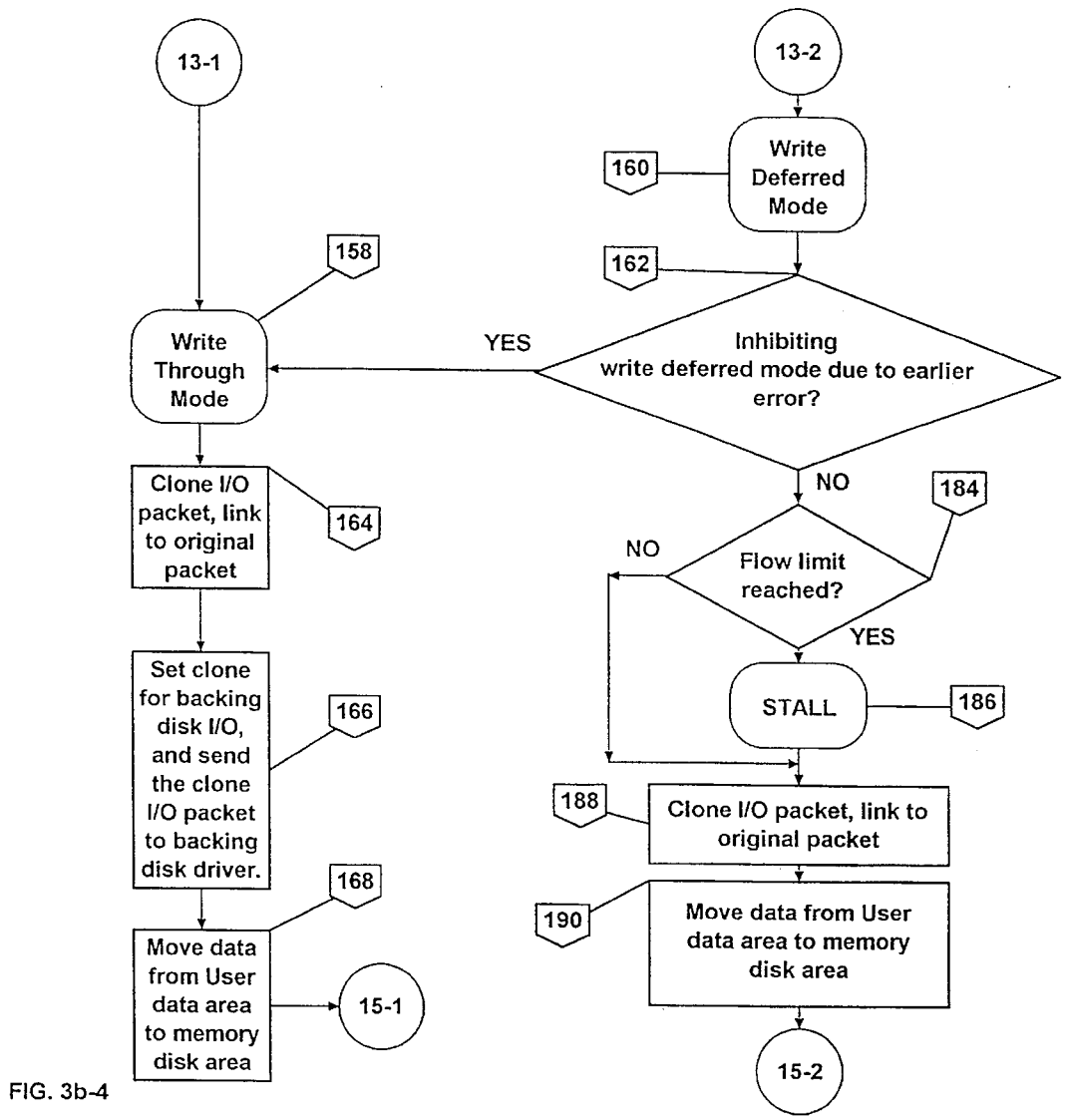

Referring now to FIG. 3b, the "all memory" (140) sequence is shown. If the program function is a read (142), this may be carried out extremely quickly. The data at the referenced memory location are moved to the user data area from the RAM at main memory access speed (144). When the read is completed, a complete I/O signal is issued (146). This illustrates the speed advantage of using a virtual disk in that the slower procedures of accessing a hard disk drive are not involved.

If the program function is a write, the program determines whether there is a backing disk present (148) for the designated memory location by looking at the virtual disk unit status. If there is no backing disk, the write operation is simply made to RAM. The data is moved from the user data area to the RAM (150) at main memory access speed. Upon the completion of the write a complete I/O signal (152) is issued. In accordance with the invention, if a backing disk is present the program checks to see if the unit is a repeat save interval unit (154). If it is a repeat save interval unit, then the write operation is simply made directly to RAM (150), and upon completion of the write to RAM a complete I/O signal (152) is issued. There is no operation in conjunction with this write related to the backing disk. The backing disk is operated separately in a repeat save interval unit with regard to the save interval timer.

Figures 1, 3C:
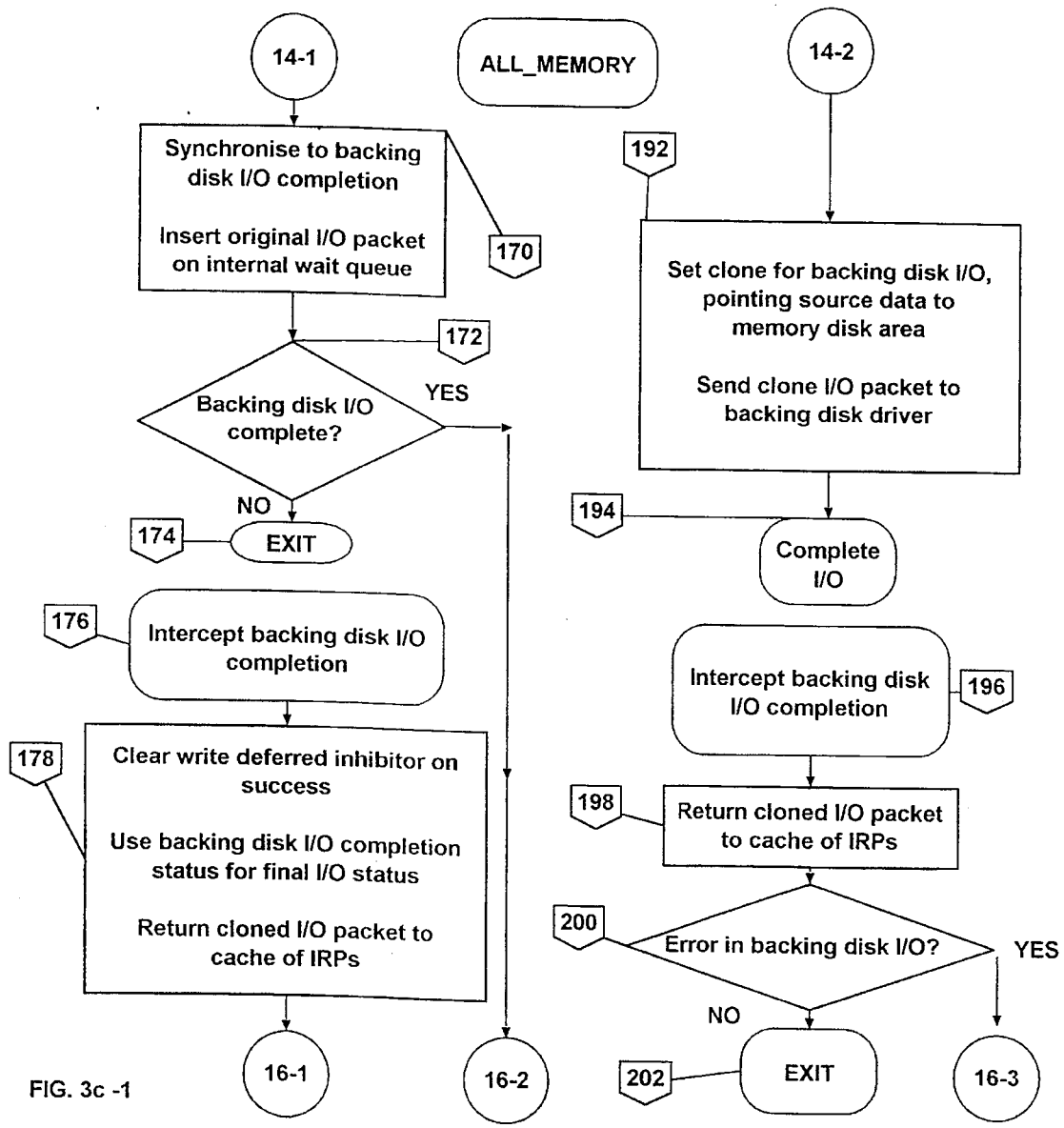
Figures 2, 3C:
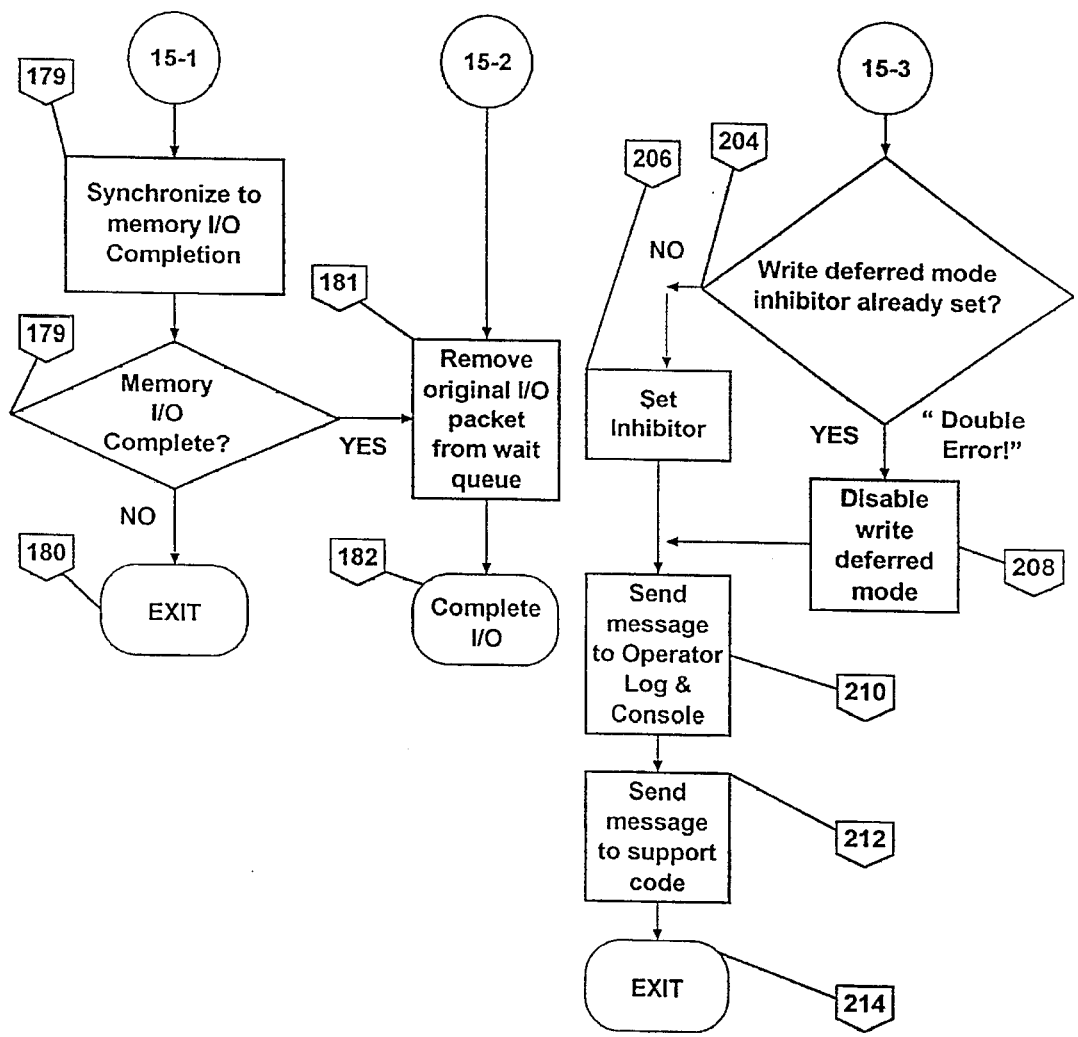

When a backing disk is present and the unit is not working as a repeat save interval unit, the program looks to the virtual disk unit status to identify whether the unit is a write deferred unit or write through unit (156). If the unit is a write through unit, the write through mode program (158) will be performed. Also, if the unit is a write deferred unit (160) and the write deferred mode has been inhibited due to an earlier error (162), the write through mode program will also be followed. The original I/O data packet is cloned and linked to the original packet (164), with the cloned I/O packet coming from the cache of IRPs. This cloned I/O packet is set for the backing disk I/O and is sent to the backing disk driver (166). The write to the memory location in the virtual disk in RAM is performed (168). Referring to FIG. 3c, I/O completion is synchronized (170) to the backing disk I/O, the original I/O packet is inserted on an internal wait queue. A complete I/O signal is not issued until the backing disk I/O is complete. If the backing disk I/O is not complete (172), the program exits (174) awaiting completion of the backing disk I/O. This exit allows the virtual disk unit to carry out other read and write commands. When the backing disk I/O completes, the complete I/O signal is intercepted (176) and the program sequence is reactivated. If this was a write deferred unit that had been inhibited, the write deferred inhibitor would be cleared upon successful completion of the disk I/O write operation (178). The backing disk I/O completion status is used for the final I/O status signal. The IRP for the cloned I/O packet to the backing disk is returned to the cache of IRPs. The backing disk I/O is synchronized to the write of the RAM (179) I/O completion. If the memory transfer was still in progress the program exits (180), awaiting completion of the memory I/O transfer in instruction block 170. The circumstance of the backing disk I/O completing before the memory I/O occurs when the backing disk discovers some error with the I/O before the backing disk write gets underway. When the write I/O completes to both the backing disk and the RAM, the original I/O packet is removed from the internal wait queue (181) and a complete I/O signal is issued (182).

Returning now to FIG. 3b, the write deferred mode of operation shall be explained. The program checks to determine whether the flow limit has been reached (184). This is done by checking the number of current outstanding writes to the backing disk against the global internal flow control write deferred limit, calculated during virtual disk unit creation in program step 108 FIG. 2c. This flow control is required as virtual disk units operating in write deferred mode are heavy users of cache IRPs. If there are insufficient IRPs in the cache of IRPs to satisfy the write I/O to backing disk the virtual disk will obtain more IRPs from the system. These IRPs come from the OpenVMS system pool and this flow control inhibits the system pool from becoming exhausted. If the flow control limit is reached, the program stalls (186) until an IRP becomes available in the cache of IRPs. The process proceeds by cloning the original I/O packet from the cache of IRPs and linking this cloned I/O packet to the original packet (188). The write to the virtual disk memory area in RAM is performed by moving data from the user data area to the memory disk area (190). Referring to FIG. 3c, the cloned I/O packet is set for the backing disk I/O, and the source data of the packet is pointed to the memory disk area of the RAM of the virtual disk (192). The cloned I/O packet is sent to the backing disk driver. The complete I/O signal is then issued (194), without waiting for the backing disk I/O to complete.

The program is re-initiated upon interception of the I/O completion by the backing disk (196). The IRP for the cloned I/O packet can be returned to the cache of IRPs (198). If the I/O is completed to the backing disk successfully without error (200), the program is completed and exited from (202). On the other hand, if there is an error, a write deferred mode inhibitor is set (206) if it has not already been set (204). This causes the next write I/O to this virtual disk unit to be done using write through mode of operation as shown in program step 162 (FIG. 3b). The next write I/O command to the virtual disk will be done in write through mode and tested for success in program step 178 (FIG. 3c). If the inhibitor has already been set, in other words, if there has been a double error, the write deferred mode is disabled (208). In this condition, the virtual disk will now be treated as a write through unit, thereby requiring that the backup to the backing disk be completed before the completion of the I/O signal is issued. In the case of an error, a message is sent to the operator log and system console (210). A message indicating the error is also sent to the virtual disk support code (212), and the program sequence exits (214).

Figure 3D:
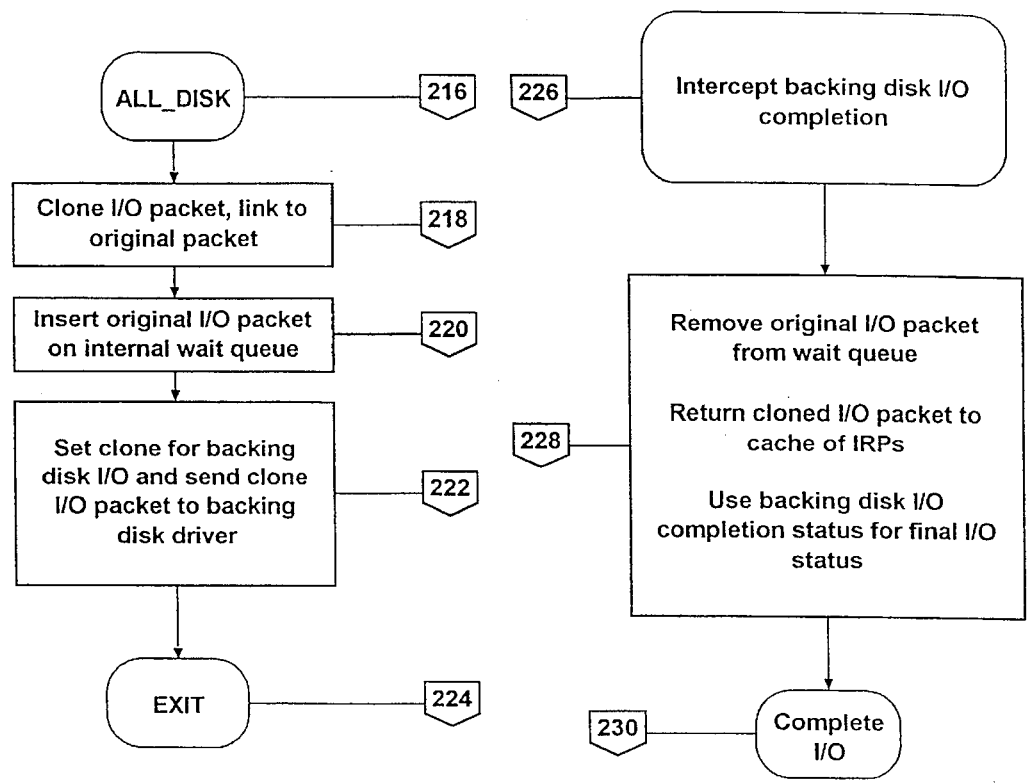
Figure 3E:
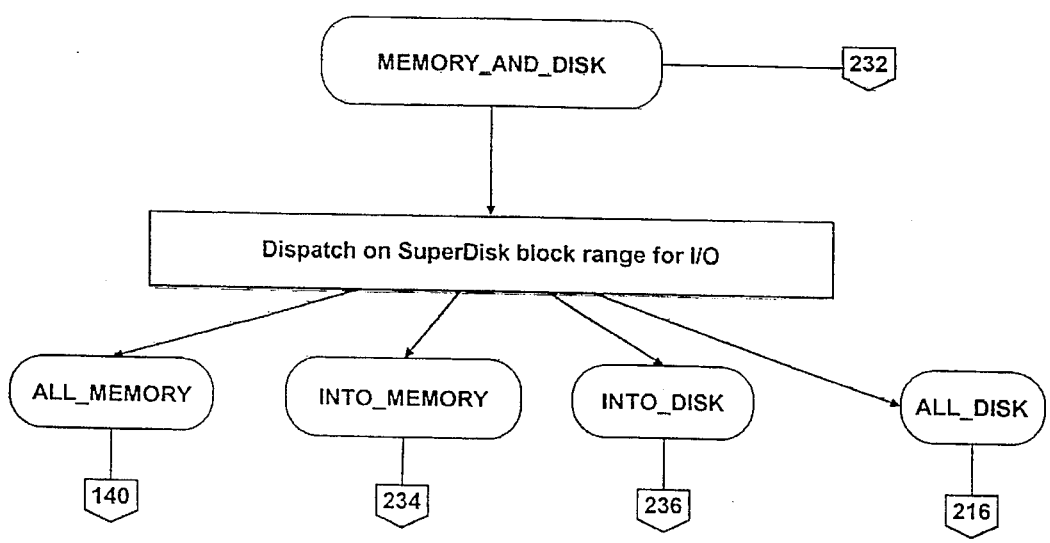
Figures 1, 3F:
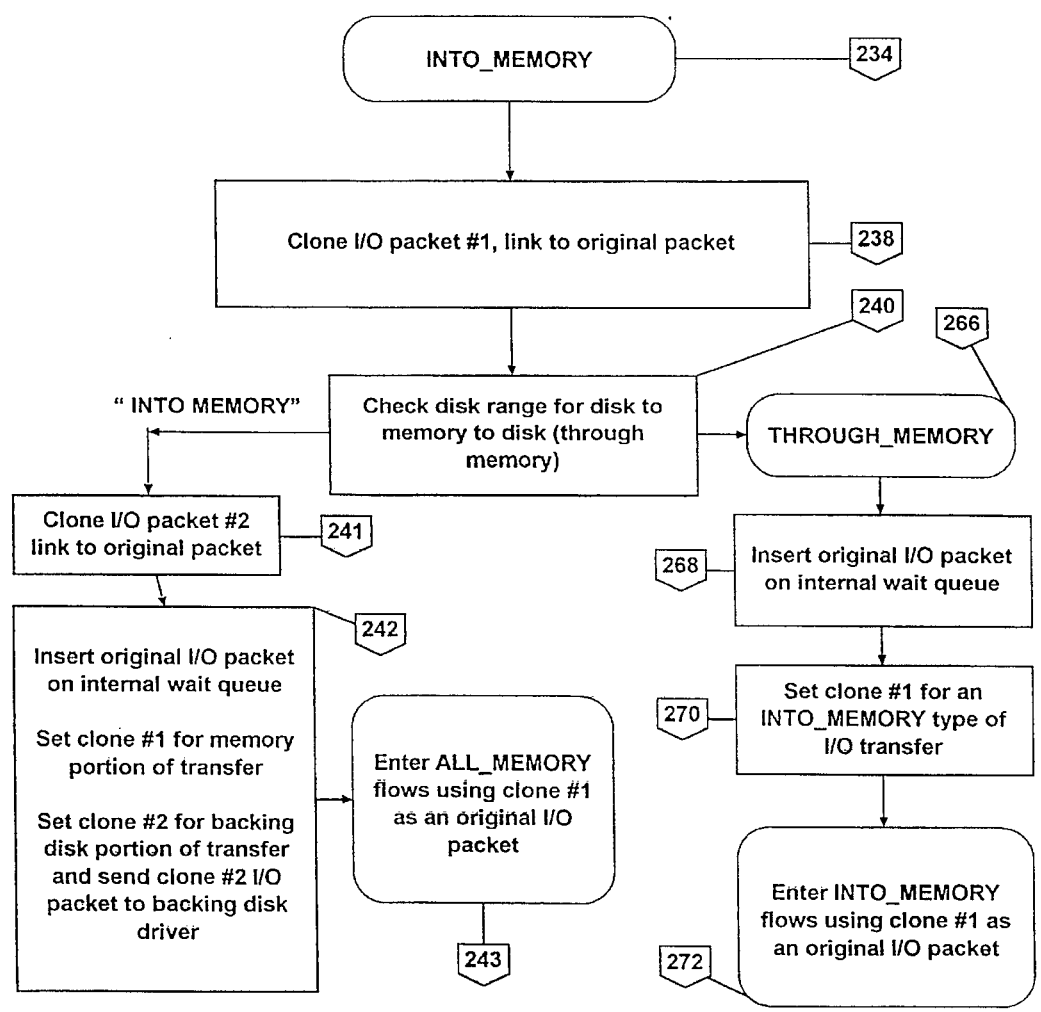
Figures 2, 3F:
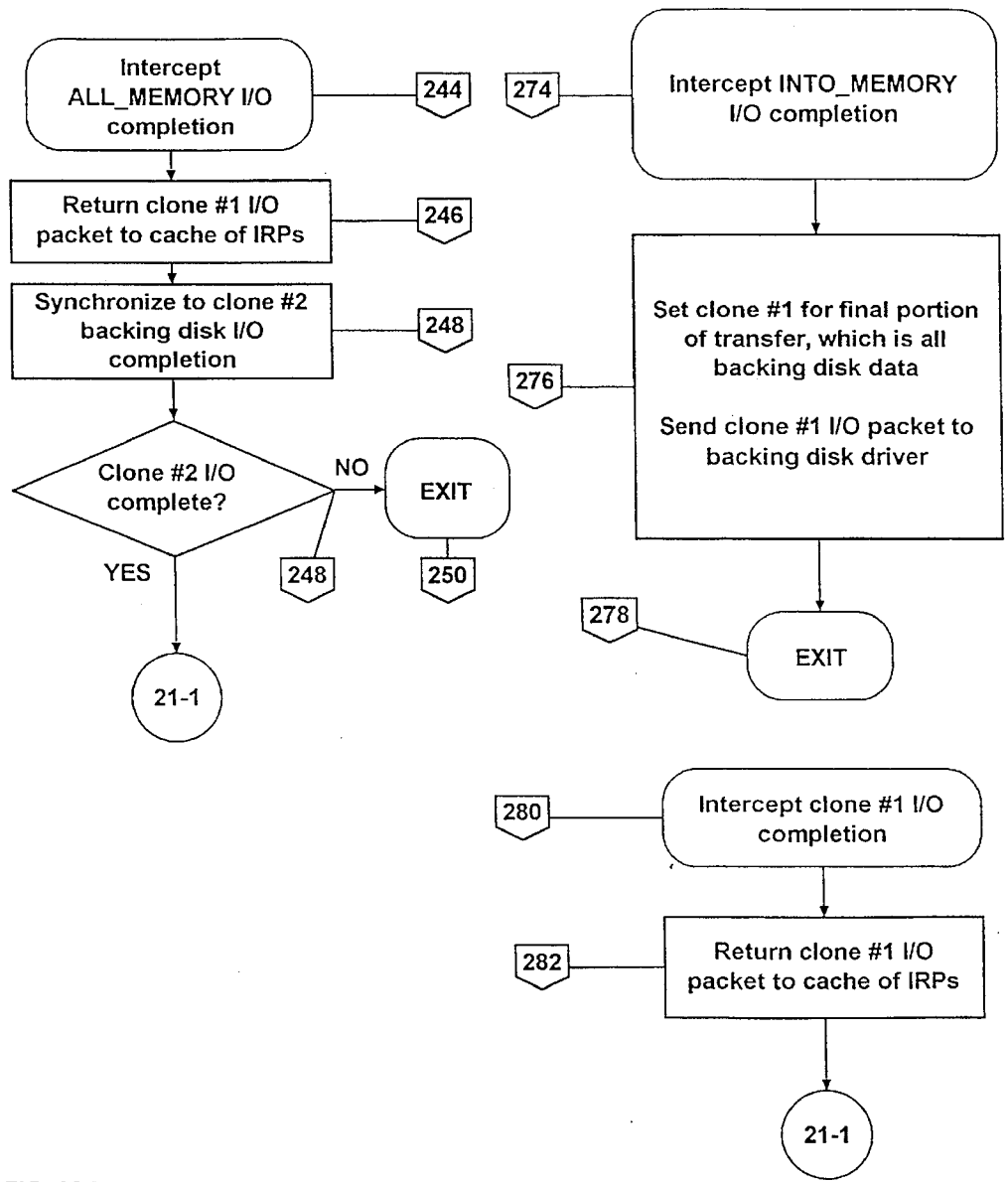
Figure 3G:
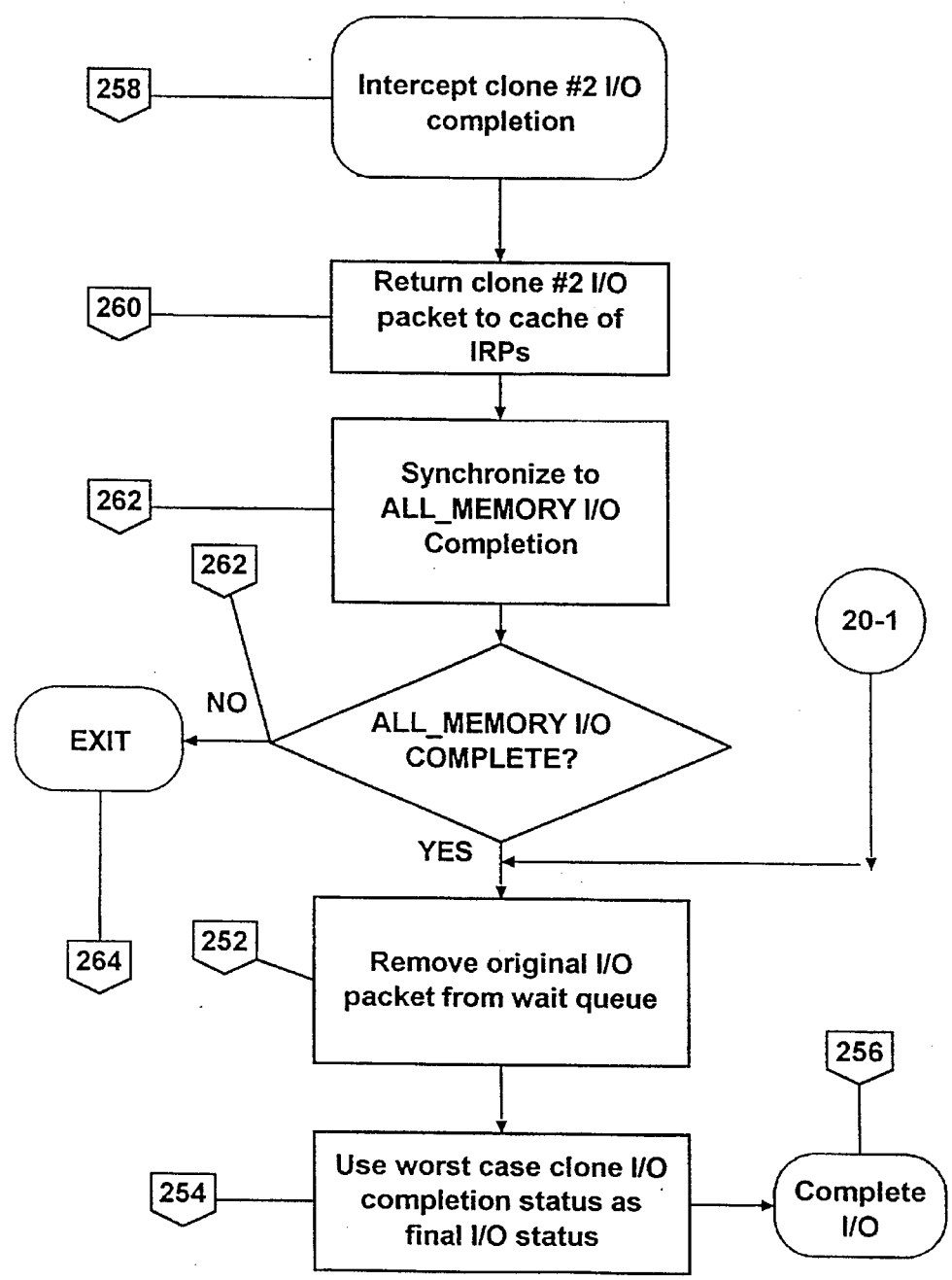
Figure 3H:
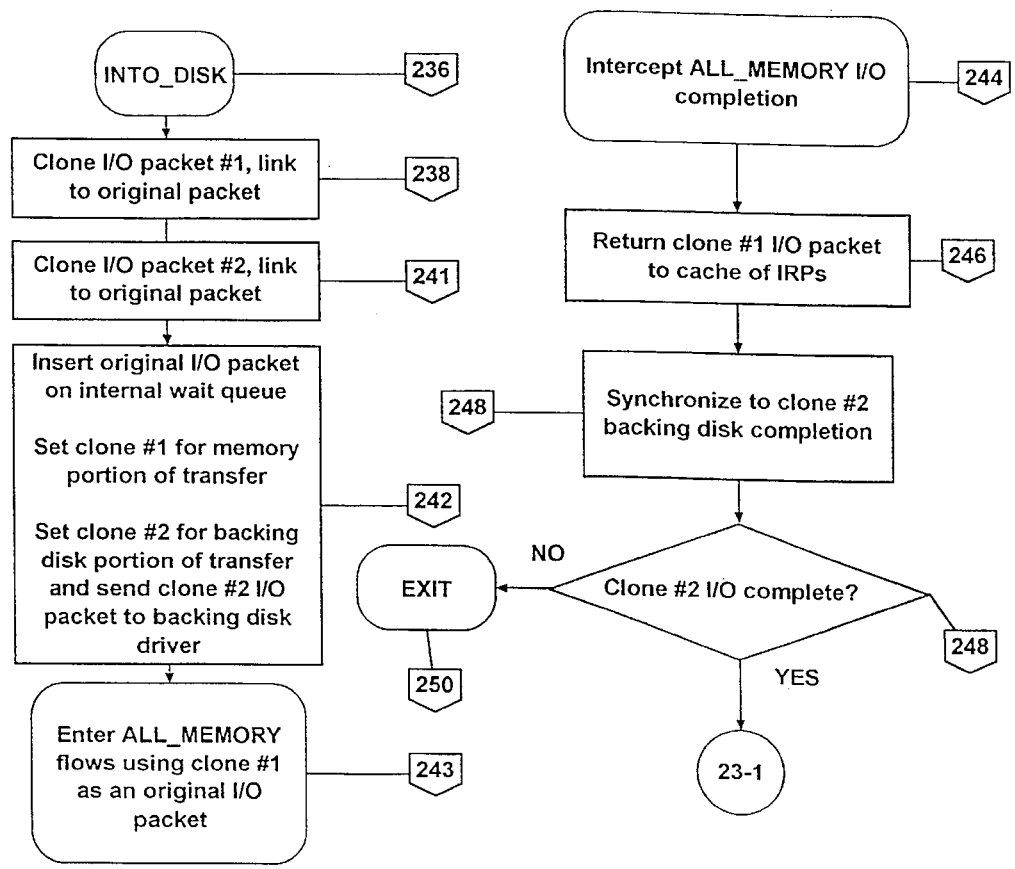
Figure 3I:
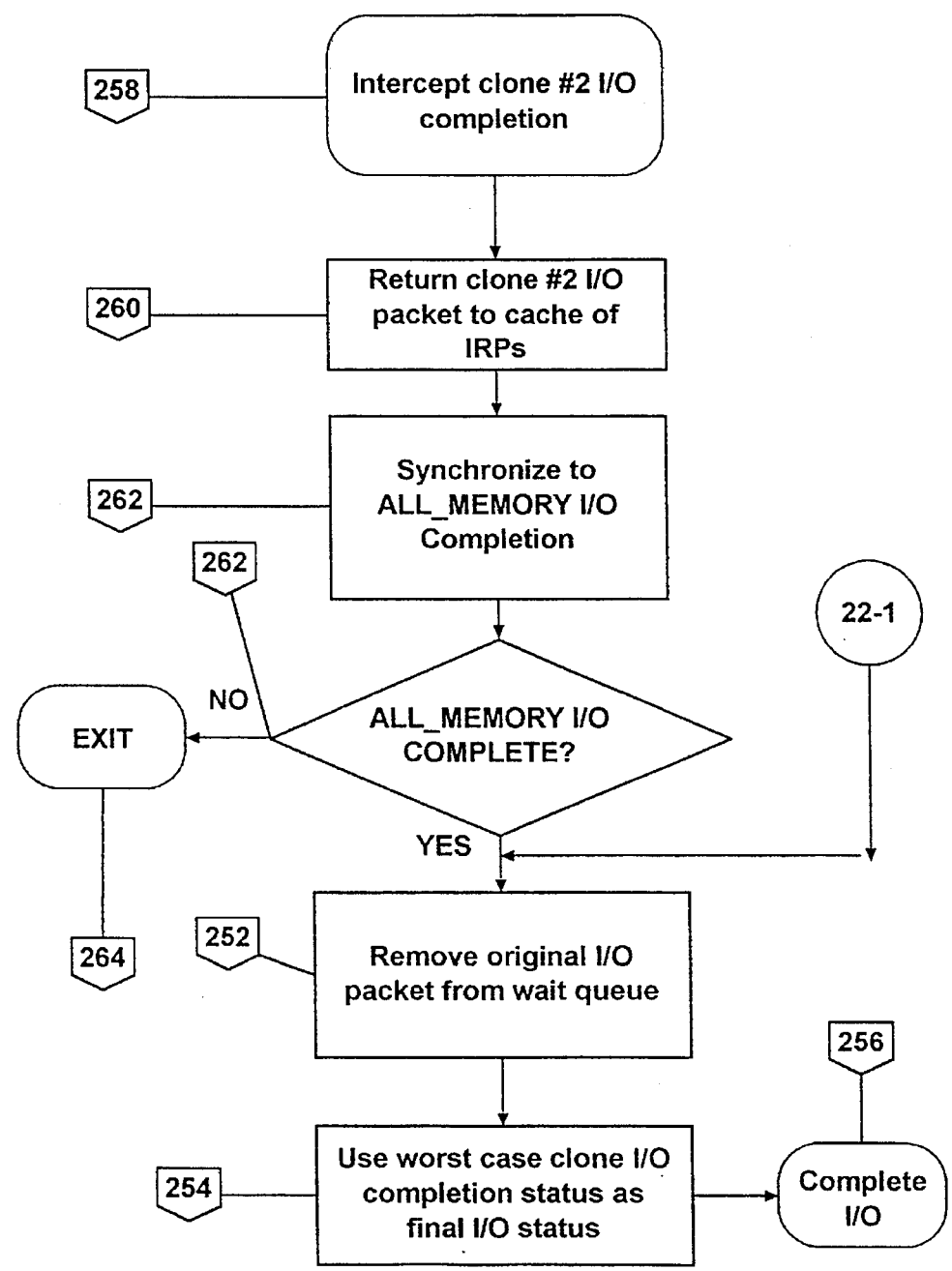

Referring to FIG. 3d, when a read or write I/O operation to a virtual disk unit addresses a portion of the disk with no RAM the "all disk" (216) program sequence is followed. The original I/O packet is cloned using an IRP from the cache of IRPs and the cloned I/O packet is linked to the original (218). The original I/O packet is inserted on an internal wait queue (220). The cloned I/O packet is set for the backing disk and sent to the backing disk driver (222). The program is exited (224). The backing disk I/O completion is intercepted, re-initiating the program (226). The original I/O packet is removed from the wait queue and the IRP for the cloned I/O packet is returned to the cache of IRPs (228). The backing disk I/O completion status is used for the final I/O completion signal (230).

When the virtual disk unit accessed by the I/O operation has its memory area spread over both RAM and a physical disk (232), the performance of the operation depends upon the range addressed by the I/O operation. If the operation only relates to a portion fully contained within the RAM of the virtual disk, the "all memory" (140) program is executed. If the portion addressed by the operation is fully contained within the physical disk, the "all disk" (216) program is executed. If the disk address range in the read or write operation begins with a virtual disk portion contained on the physical disk and extends over into a portion contained in RAM, the "into memory" (234) program is executed. If the disk address range in the read or write operation begins with a virtual disk portion contained in RAM and extends over into a portion contained on the physical disk, the "into disk" (236) program is executed. The "into memory" (234) program and the "into disk" (236) program are actually identical, except that the "into memory" (234) program provides for checking on a special situation in which the virtual disk range addressed by the read or write operation begins with a portion contained on the physical disk, extends over the entire portion contained in RAM and continues to extend back onto another portion contained on the physical disk. This special situation will be discussed later below.

The ordinary situation of "into memory" (234) or "into disk" (236) in which virtual disk address portions are singularly split between RAM and physical disk shall now be described. It should be noted that in the case of a virtual disk unit that spans the RAM and a backing disk, only the write through mode is available in accordance with the presently preferred embodiment of the invention. Two cloned I/O packets taken from the cache of IRPs are required in which virtual disk address portions are split between RAM and physical disk. The first is termed "clone I/O packet #1" and is used in the read or write portion that encompasses the RAM area of the virtual disk unit. The second is termed "clone I/O packet #2" and is used in the read or write portion that encompasses the physical disk area of the virtual disk unit. The original I/O packet is cloned from the cache of IRPs to form clone I/O packet #1 (238) and this is linked to the original I/O packet. The program checks for the special situation of disk-memory-disk (240). When the special situation does not exist, the original I/O packet is cloned again from the cache of IRPs to form clone I/O packet #2 (241) and this is linked to the original I/O packet. The original I/O packet is inserted on the internal wait queue (242). The clone I/O packet #1 is set for the RAM portion of the data transfer. The clone I/O packet #2 is set for the physical disk portion of the data transfer and the clone I/O packet #2 is sent to the backing disk driver. The clone I/O packet #1 is used to enter the "all memory" (140, FIG. 3b) program as an original I/O data packet (243). The program is set to intercept both the clone I/O packet #1 (244) I/O completion from the "all memory" (140, FIG. 3b) program and the clone I/O packet #2 (258, FIG. 3g) I/O completion from the backing disk I/O. Which intercept occurs first is dependent on system timing and synchronization is required between both I/O completion's before the original I/O packet can be signalled as completed. When the "all memory" program is complete with clone I/O packet #1 (244) the program continues at this point and returns the clone I/O packet #1 to the cache of IRPs (246). The program synchronizes to the clone I/O packet #2 completion from the backing disk I/O (248) and if the clone I/O packet #2 is not complete the program exits (250). If the clone I/O packet #2 had already completed before the "all memory" clone I/O packet #1 the original I/O packet is now removed from the internal wait queue (252) and the worst case I/O completion status from either clone I/O packet #1 or clone I/O packet #2 is used (254) to signal the final original I/O completion status signal (256). When the clone I/O packet #2 completes from the backing disk (258) the program continues at this point and the clone I/O packet #2 is returned to the cache of IRPs (260). The program synchronizes to the alone I/O packet #1 completion (262) from the "all memory" program and if the clone I/O packet #1 had not completed its I/O the program exits (264). If the clone I/O packet #1 had completed before this clone I/O packet #2 then this program sequence will remove the original I/O packet from the internal queue (252), using the worst case I/O completion status (254) of the two clones to complete the original I/O (256).

In the special situation when the read or write operation extends from a portion of the virtual disk contained on a physical disk through the whole of the portion contained in RAM and back onto a portion contained on a physical disk, the "through memory" (266, FIG. 3f) program is followed. The original I/O packet is inserted on an internal wait queue (268). The clone I/O packet #1 is adjusted so that the size of the transfer encompasses the first portion of the data contained on the physical disk and all the data contained in RAM (270). Using this clone I/O packet #1 (272) as if it were an original I/O packet the "into memory" (234) program is entered. When the "into memory" I/O completes it is intercepted (274) and the program resumes at this point. This I/O completion will be using the very first clone I/O packet #1, adjusted for the "into memory" size of transfer, as if it was signalling the completion of an original I/O packet. This clone I/O packet #1 is now readjusted for the final portion of the transfer which is all on physical disk (276) and is sent to the backing disk driver. The program then exits at this point (278). When the backing disk I/O completes it is intercepted (280) and the program resumes operation at this point. The clone I/O packet #1 is returned to the cache of IRPs (282). The original I/O packet is then removed from the internal queue (252) and the worst case of all three clone I/O packet completion's (254) is used to complete the original I/O signal status (256).

Figure 4A:
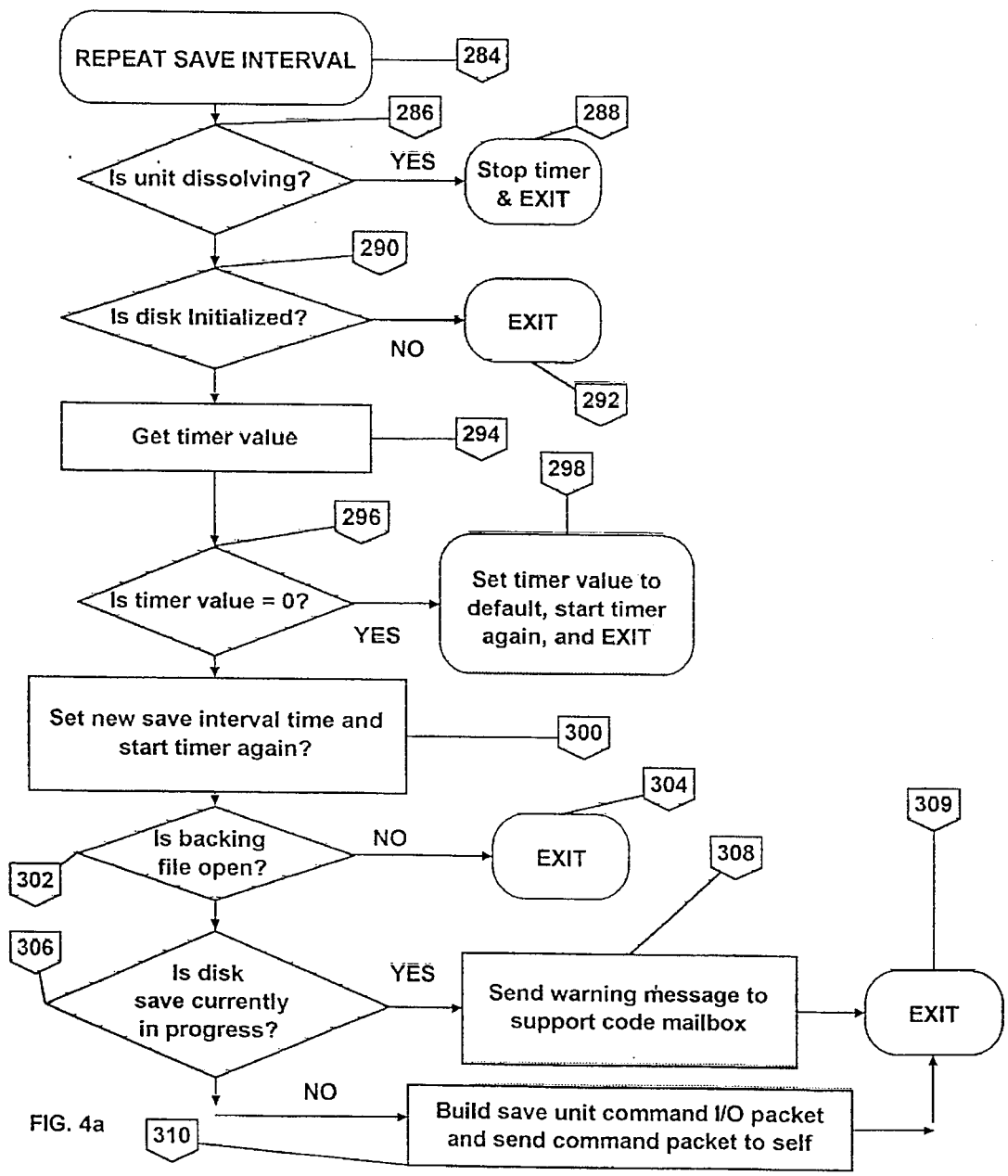
FIGS. 4a and 4b are flow diagrams on the program steps for saving the contents of a virtual disk implemented by one embodiment of the invention.
Figures 1, 4B:
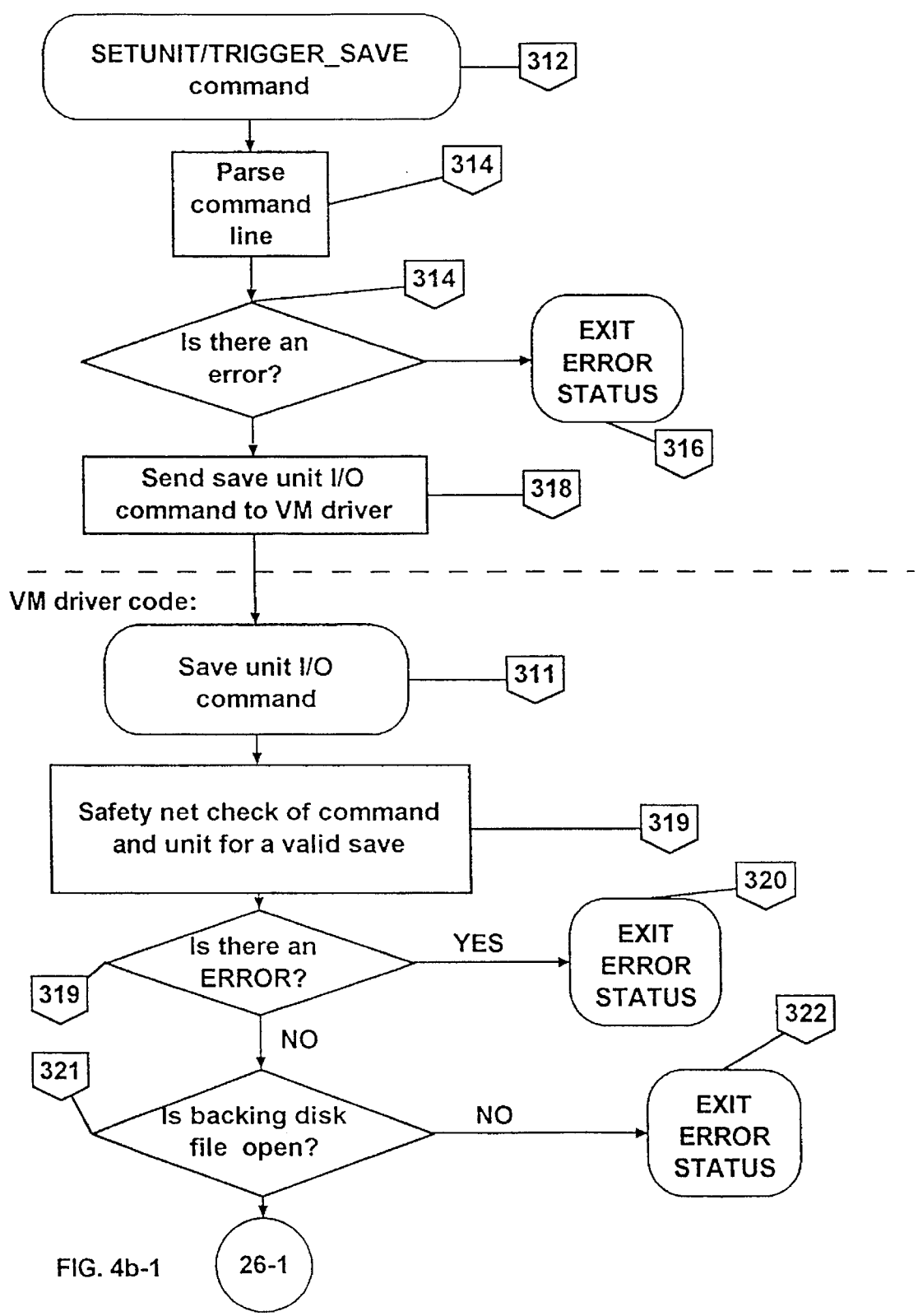
Figures 2, 4B:
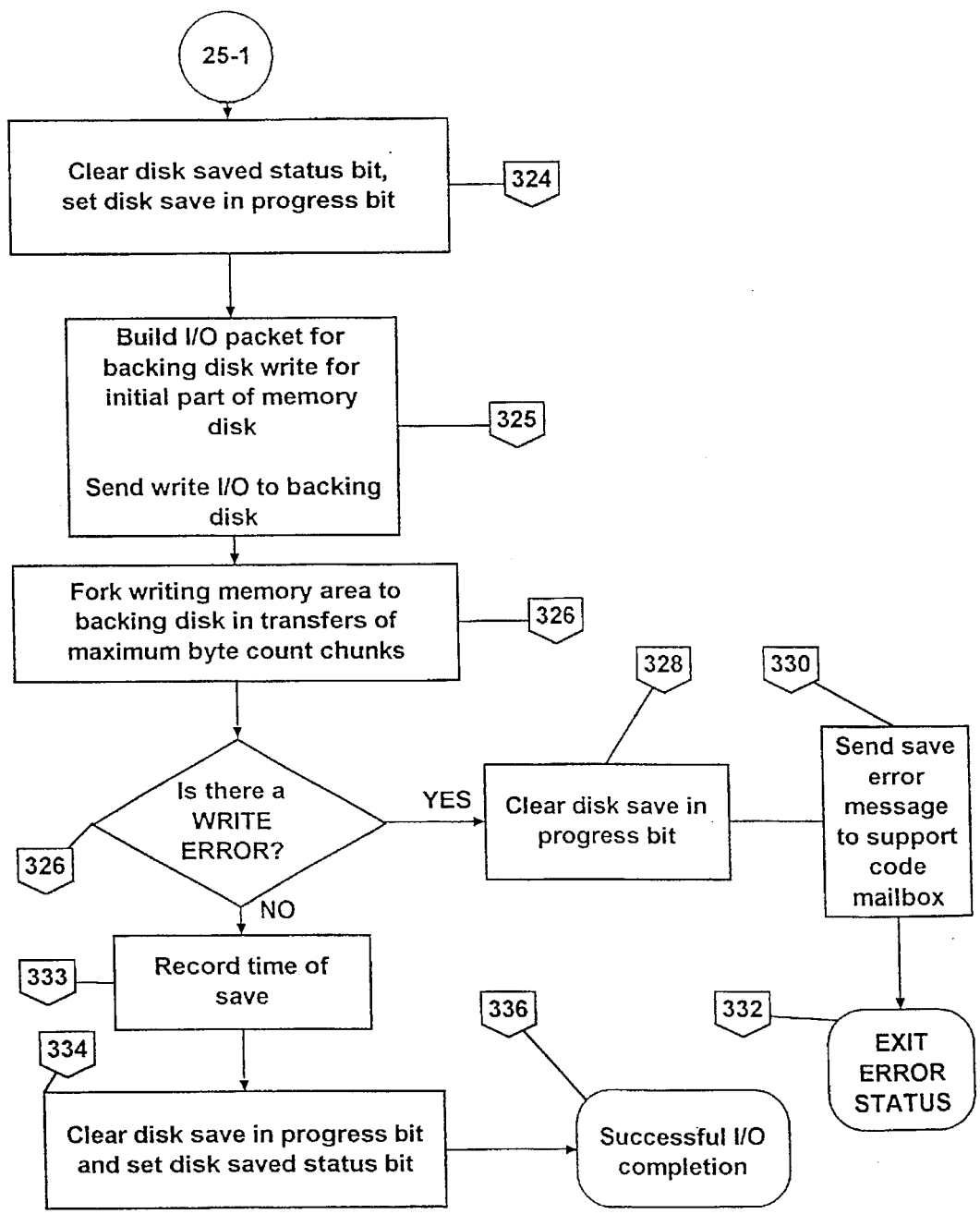

Referring now to FIGS. 4a and 4b, the save unit program which is periodically performed when a virtual disk is set up as a repeat save interval unit shall be described. A save unit command can be called for automatically by the periodic completion of a repeat save interval (284, FIG. 4a) or manually by the user interface code using the SETUNIT command (312, FIG. 4b). Both the automatic and manual save command are handled by the VM driver code (311, FIG. 4b) in the same way, only the initiation of that command comes from a different source. The periodic completion of a repeat save interval will initiate the "save interval" flow as shown on FIG. 4a. The present preferred embodiment of the invention uses a timer function within the OpenVMS system to implement the periodic save interval. With the present preferred embodiment of the invention, this periodic save interval can range from 1 minute by default and up to 65536 minutes by the user SETUNIT command when a virtual disk using the repeat save interval mode of operation was created, specified through the set-up buffer (16, FIG. 1). With the present preferred embodiment of the invention, after a virtual disk using the repeat save interval mode of operation is created the user can alter the repeat save interval periodic interval by a variation of the SETUNIT command from 1 minute up to 65536 minutes. In the present embodiment, the variation in the SETUNIT command is SETUNIT/MODIFY=SAVE–INTERVAL="value" where "value" can range from 0 to 65536, specifying the new repeat save interval periodic time in minutes. The value 0 in the present preferred embodiment of the invention causes the default repeat save periodic time interval of 1 minute to be used, and this value of 0 is used to specify a manual only form (312, FIG. 4b) of saving the virtual disk RAM contents to backing disk.

Referring to FIG. 4a, when the OpenVMS system timer period expires the VM driver program is called at the "save interval" entry point (284). In performing the save interval flow, the program checks to determine whether the virtual disk unit is being dissolved (286). If it is, the interval timer is stopped and an exit is made from the code (288). The virtual disk is checked that it has been fully initialized in its creation (290). If not, the program is exited from (292). The program gets the value of the save interval period time (294) to determine the value that it has been set to, either by when it was created or by user change request in the SETUNIT/ MODIFY=SAVE-INTERVAL="value" command. If the value requested was 0 (296), the user has specified the manual only method of saving the virtual disk contents in RAM to backing disk, so the program sets the next save interval period time to 1 minute and exits (298). If the value requested was not 0, the program sets the next save interval time to the value selected and starts the OpenVMS timer again (300). Before performing the automatic save, the program checks to make sure that the backing file is open (302). If the file is not open, the program is exited from (304). A status bit is checked to determine whether a virtual disk save is currently in progress (306). If the virtual disk save is currently in progress a warning message (308) is sent to the support code mailbox (34, FIG. 1) and the program is exited from (309). If everything is in order, the command packet for triggering the VM driver to perform a save unit is built (310) and sent to itself, the VM driver. This calls the VM driver code at the save unit flow at FIG. 4b instruction block 311. The repeat save interval code then exits (309) awaiting the next interval period.

Referring to FIG. 4b, the manual save unit command in the present preferred embodiment of the invention is a SETUNIT/TRIGGER–SAVE command (312). The SETUNIT user interface program will first parse the command (314). An error in syntax results in an error (316) and no further processing is performed in response to the erroneous command. The save unit command packet for triggering the VM driver to perform a save unit is sent to the VM driver (318). This calls the VM driver at the save unit flow (311) similar as if the automatic repeat save interval period has expired. The VM driver makes a safety check (319) of the command against the unit to determine that the save is a valid command that can be properly executed. If not, the program exits in error (320). The backing disk file is checked to make sure it is open (321). If not, the program exits in error (322). The virtual disk saved status bit is cleared and a save in progress bit is set (324) in the virtual disk unit status (46, FIG. 1). This save in progress bit prevents another automatic repeat save interval period from requesting a save whilst the current save is in progress. An I/O packet is built for writing the initial part of the virtual disk in RAM to the backing disk (325) and the write I/O command is sent to the backing disk. The write I/O command is adjusted and sent to the backing disk until the whole of the virtual disk in RAM is transferred to the backing disk (326). Each transfer can make an I/O transfer of the maximum byte count chunk for the backing disk so as best to expedite the operation. If an error occurs whilst writing these chunks of RAM to the backing disk, the disk save in progress bit is cleared (328). The fact that there was an error during the save is sent (330) to the support code mailbox (34, FIG. 1), then the program is exited from (332). If no error occurs whilst performing the save to the backing disk, the time of the save is recorded (333). The virtual disk save in progress bit is cleared and the virtual disk saved status bit is set (334). The program is completed with a successful status (336).

Figure 5:
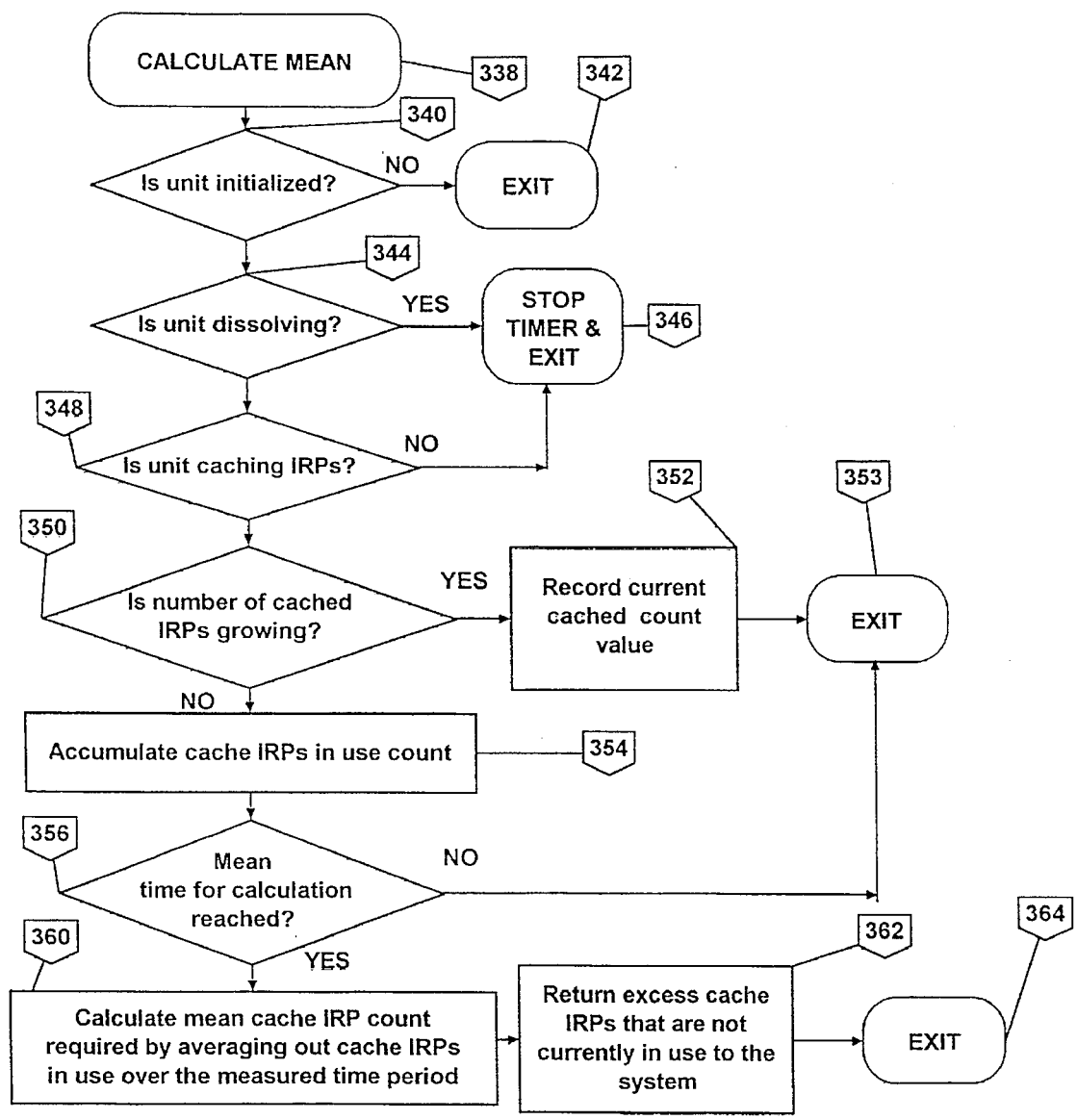
FIG. 5 is a flow diagram of the steps for performing a mean cache IRP count in accordance with an embodiment of the invention.

Referring to FIG. 5, in order to minimize the impact of a virtual disk and its cache of IRPs, a "calculate mean" program (338) is run every so often to determine how many IRPs are actually needed so that any additional IRPs can be returned to the OpenVMS system for use by other devices. The present preferred embodiment uses an OpenVMS system timer to call up the "calculate mean" program every 7 seconds, this timer is initiated when a virtual disk unit is created (106, FIG. 2c). The program begins by checking that the virtual disk unit is fully initialized by its creation (340).

If not, the program exits (342). The program checks that the virtual disk unit is not being dissolved and if it is the OpenVMS timer is stopped and the program exits (346). The program checks that the virtual disk unit is caching IRPs (348). If not, the OpenVMS timer is stopped and the program exits (346). A virtual disk unit can be prevented from caching IRPs either from the "pool checker" program (366, FIG. 6) and in the present preferred embodiment of the invention by user request with the SETUNIT command on a virtual disk units creation. The program checks to see whether the number of cached IRPs is growing (350). The number of cached IRPs can grow when all the current IRPs in the cache are in use by a virtual disk and further write I/O commands are being received by the virtual disk which require a backup to the backing disk. If there is an increase in the number of cached IRPs the current cached count value is recorded (352) to determine growth in the next pass and the program exits (353). If the number of cached IRPs is not growing, the program continues by accumulating the number of cached IRPs in use with a backup to the backing disk (354). If the time has not been reached in which to calculate the mean number of cached IRPs (356) required the program exits (353). If the measurement time has been reached, 224 seconds in the present preferred embodiment of the invention, the program calculates the mean number of cached IRPs required by calculating the average number of cached IRPs in use over the measurement period (360). Any additional cached IRPs are returned to the OpenVMS system (362) and the program exits (364).

Figures 1, 6:
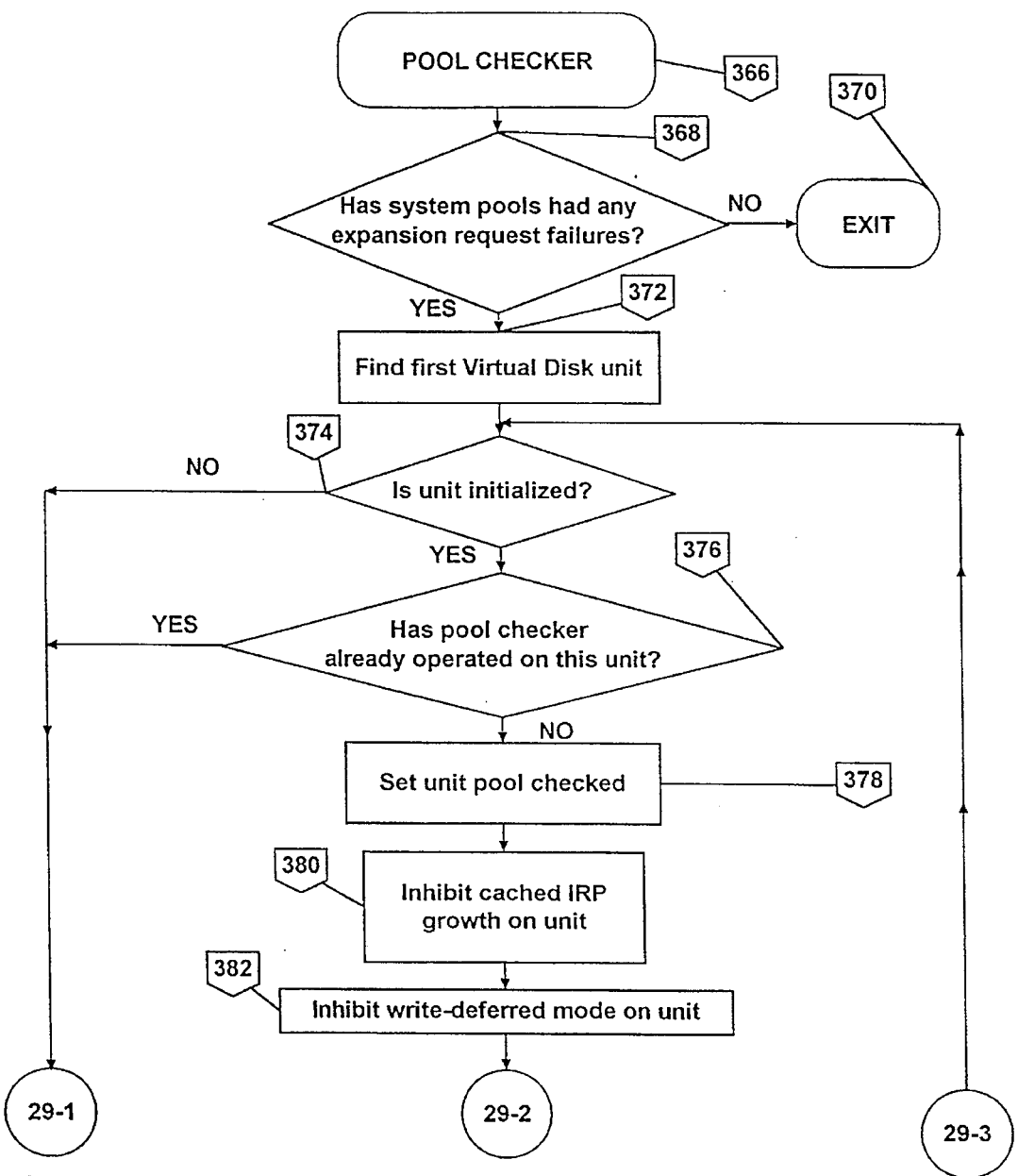
FIG. 6 is a flow diagram of the program steps for conducting a system pool check in accordance with an embodiment of the invention.
Figures 2, 6:
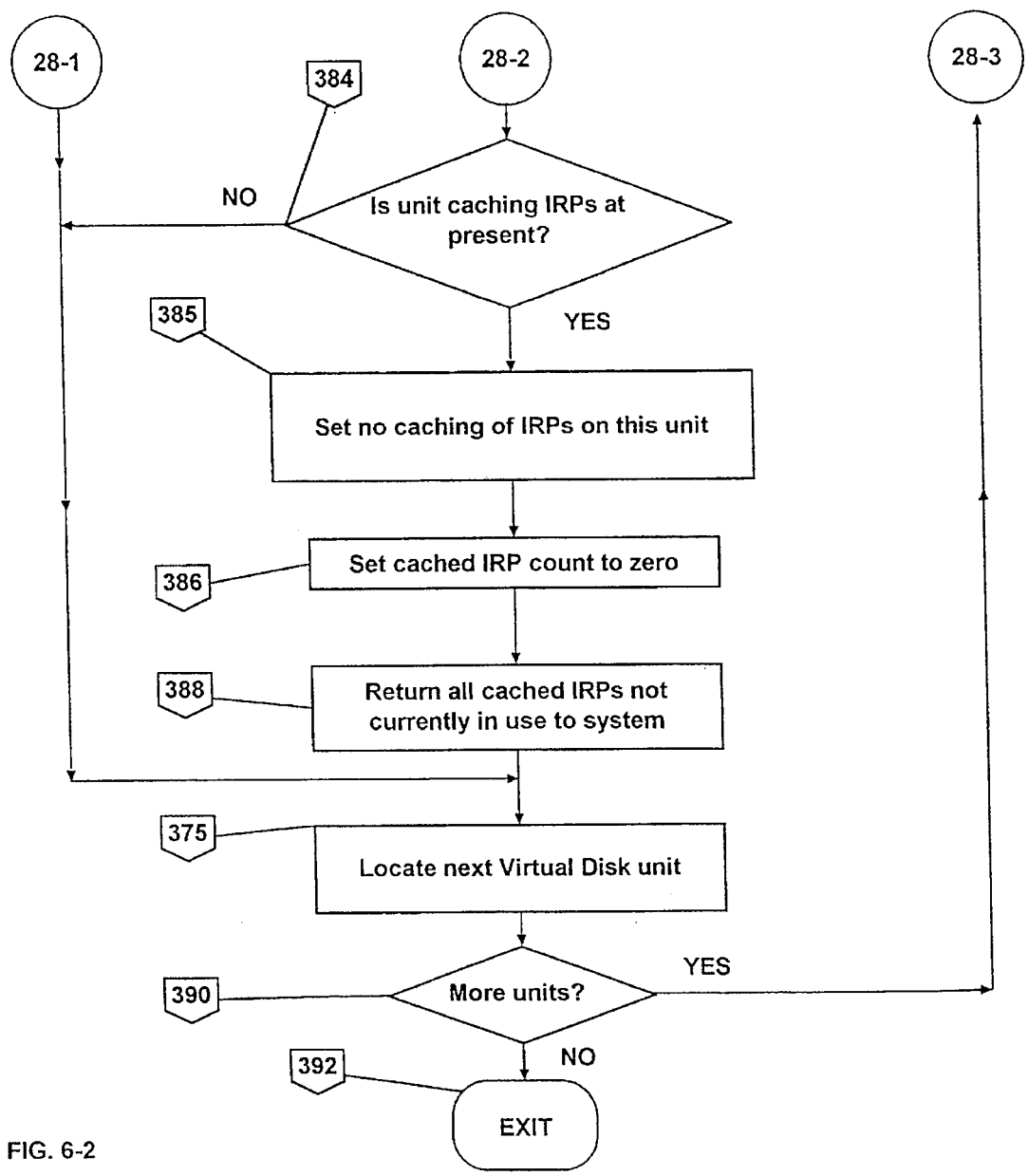

Referring to FIG. 6, each virtual disk unit on the system has its own mean cache IRP calculator as described above, there is however just one system pool checker for all the virtual disk units on the system. The system pool checker is designed to remedy the situation where virtual disk units had so many IRPs in their cache that the system became starved of pool. Under these circumstances the OpenVMS system would attempt pool expansion which itself could fail causing a huge performance degradation and a possible system hang. The pool checker attempts to stop this system performance degradation and hang from occurring. The present preferred embodiment of the invention expects that the system manager would at some future time after pool expansion had occurred to attempt to re-tune their OpenVMS system, which itself would detect the pool expansion from internal OpenVMS status fields and adjust itself for more pool. Thus at some time there would be a situation where the OpenVMS system would not suffer with pool starvation, having been tuned for the virtual disk units operating on the system. The program sequence on FIG. 6 shows the steps taken by the pool checker code. On the present preferred embodiment of the invention, the "pool checker" program (366) is called from an OpenVMS timer. The timer is initiated when the VM driver is first loaded into the system and can have one of three time periods. With the present preferred embodiment of the invention, the first time period the "pool checker" program acquires is 60 seconds and this is set when VM driver is first loaded into the system. After, the first initial operation of the pool checker code the time period it acquires is 11 seconds for each subsequent call to the pool checker code. If the pool checker code coincides with the mean cache IRP calculation code returning IRPs to the OpenVMS system pool, the pool checker time period will be set down to 2 seconds, resetting to 11 seconds when there are no further collisions between the pool checker and the mean cache IRP calculator. None of these three time period selections are shown in the program flow diagrams Referring to FIG. 6, the program sequence will now be described. The "pool checker" program (366) will be called when one of the three time periods described above had expired. The program would check to see if the system had any pool expansion failures (368). If not, the program exits (370). If there had been a system pool expansion failure, the program locates the first virtual disk unit (372). The program checks to see whether this unit has been fully initialized by its creation (374). If not, the program looks to the next virtual disk unit (375). The program checks whether the pool checker has operated on this virtual disk unit (376) before and if so it looks to the next unit (375). The program sets the status bits in the virtual disk unit status (46, FIG. 1) to indicate that this unit has been worked on by the pool checker (378), this in turn will prevent the user from requesting the virtual disk unit cache IRPs in future by the SETUNIT command. The program will inhibit the virtual disk unit from growing the number of IRPs it can hold in its cache (380). Write deferred mode of operation, if selected would be disabled causing the unit to operate in write through mode from then on (382). Virtual disk units operating in write deferred mode are heavy users of cloned IRPs which either come from the cache of IRPs, or from the system pool if there are none available in the cache of IRPs. As such virtual disk units operating in write deferred mode would send many requests to the system pool to obtain an IRP for cloning if there are none in the cache of IRPs, defeating any attempt to recover from pool expansion failures. The program checks to see if the virtual disk unit has been set to not cache IRPs as selected by the user when the unit was created with the SETUNIT command (384). If the virtual disk unit is set not to cache IRPs then the program looks to the next virtual disk unit (375). The program inhibits this unit from caching IRPs (385). The program sets the number of cached IRPs to 0 (386) and returns all cached IRPs not currently in use back to the OpenVMS system (388). Any cached IRPs currently in use will be automatically returned to the OpenVMS system when an attempt to return them to the cache of IRPs occurs in the write I/O program sequence. The program looks for the next virtual disk unit (375). If there are no more virtual disk units (390), the program exits (392), otherwise the program loops to deal with the next unit (374) until all the virtual disk units have been checked by the pool checker.

Figures 1, 7A:
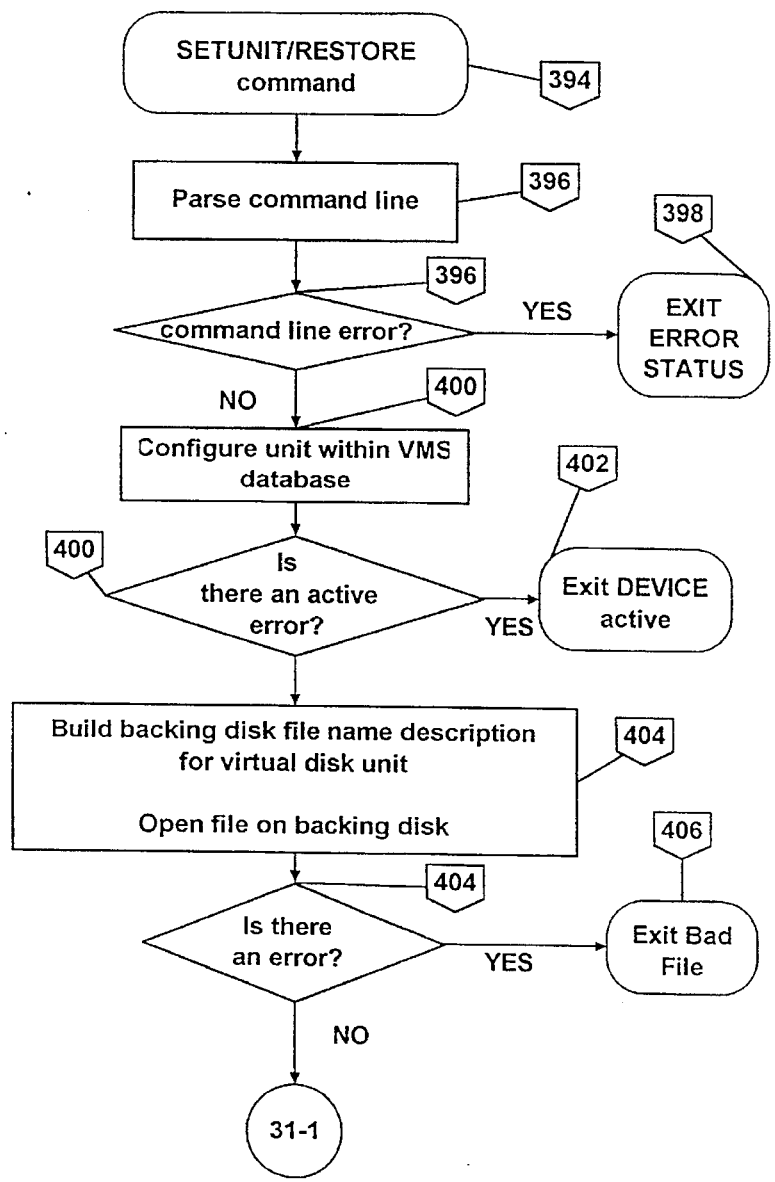
Figures 2, 7A:
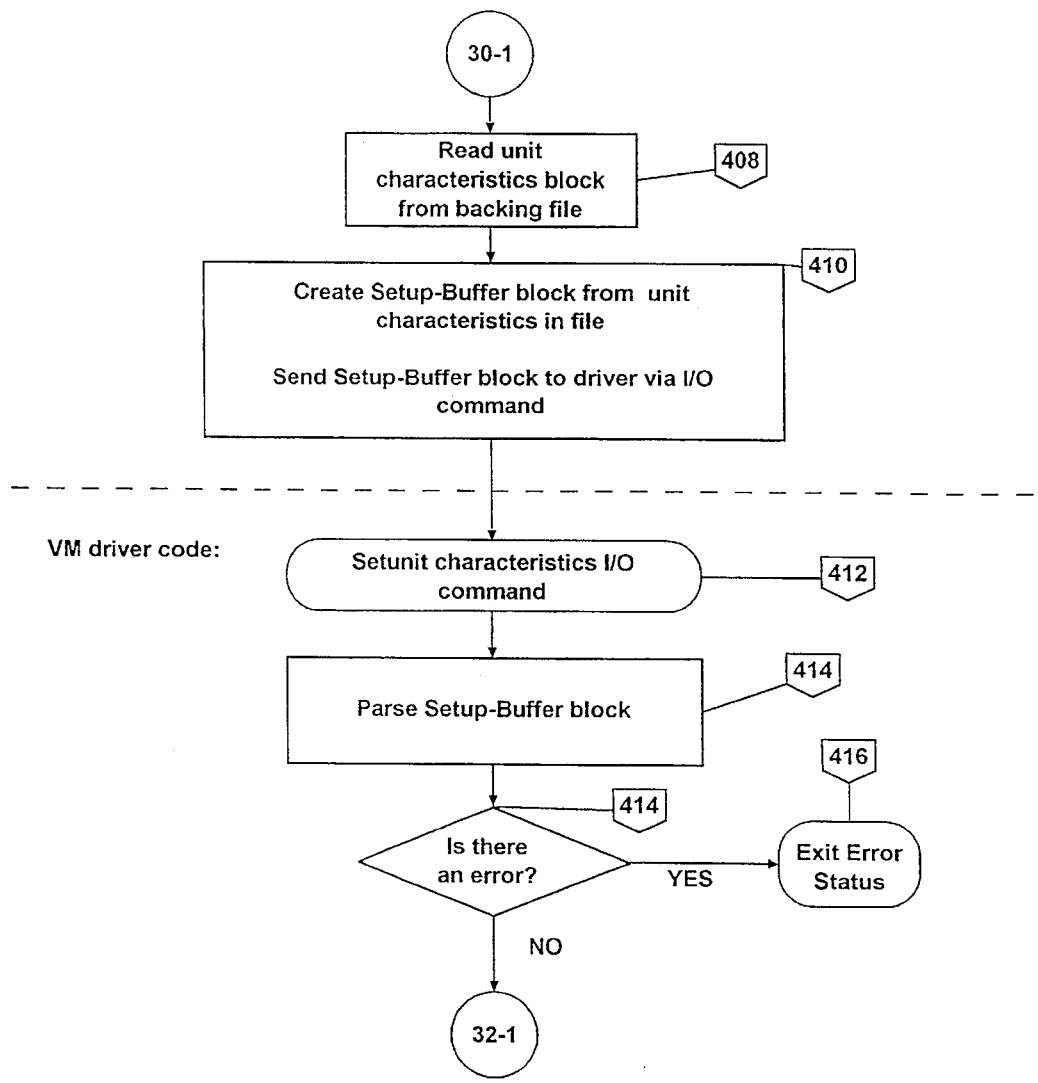
Figures 1, 7B:
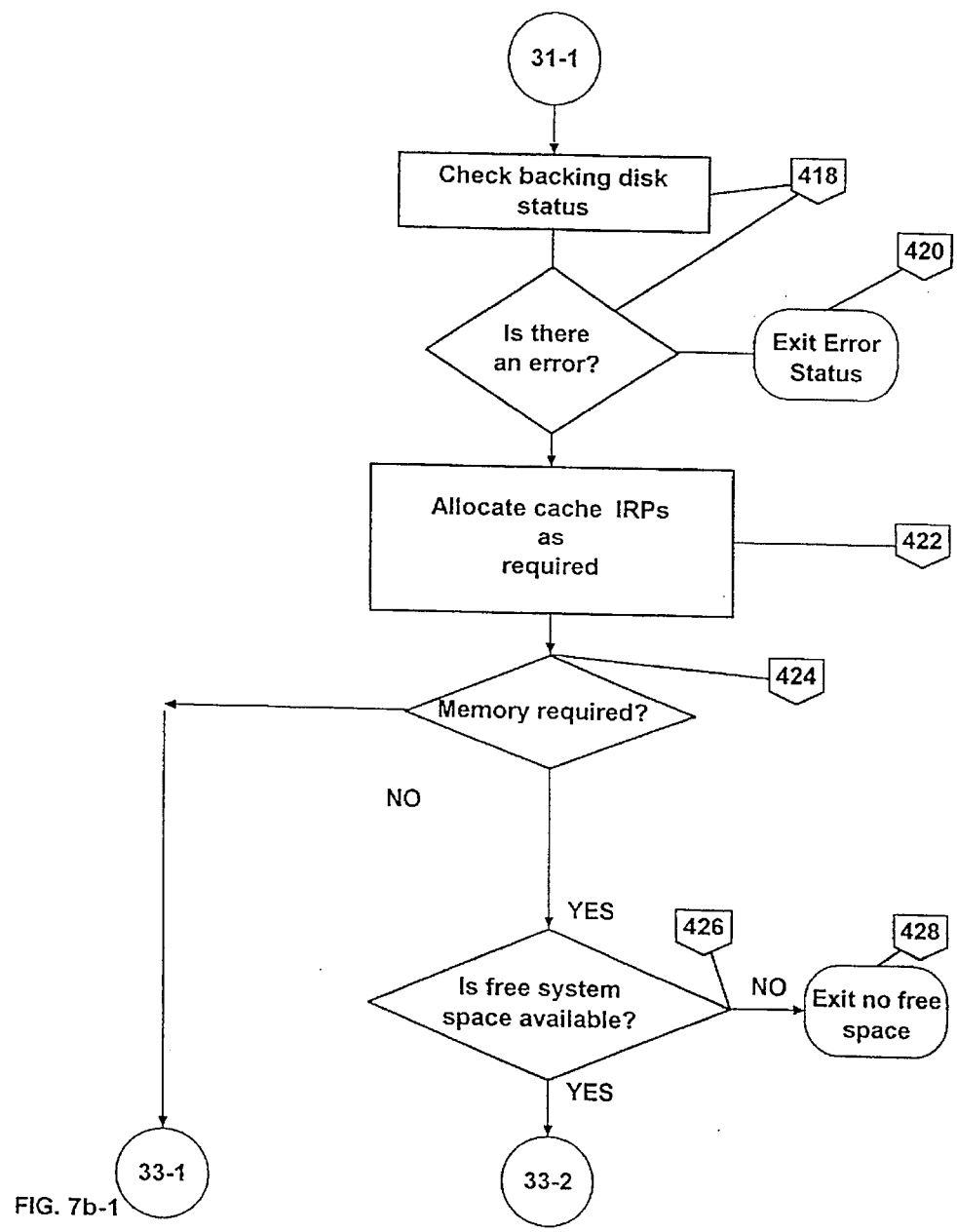
Figures 2, 7B:
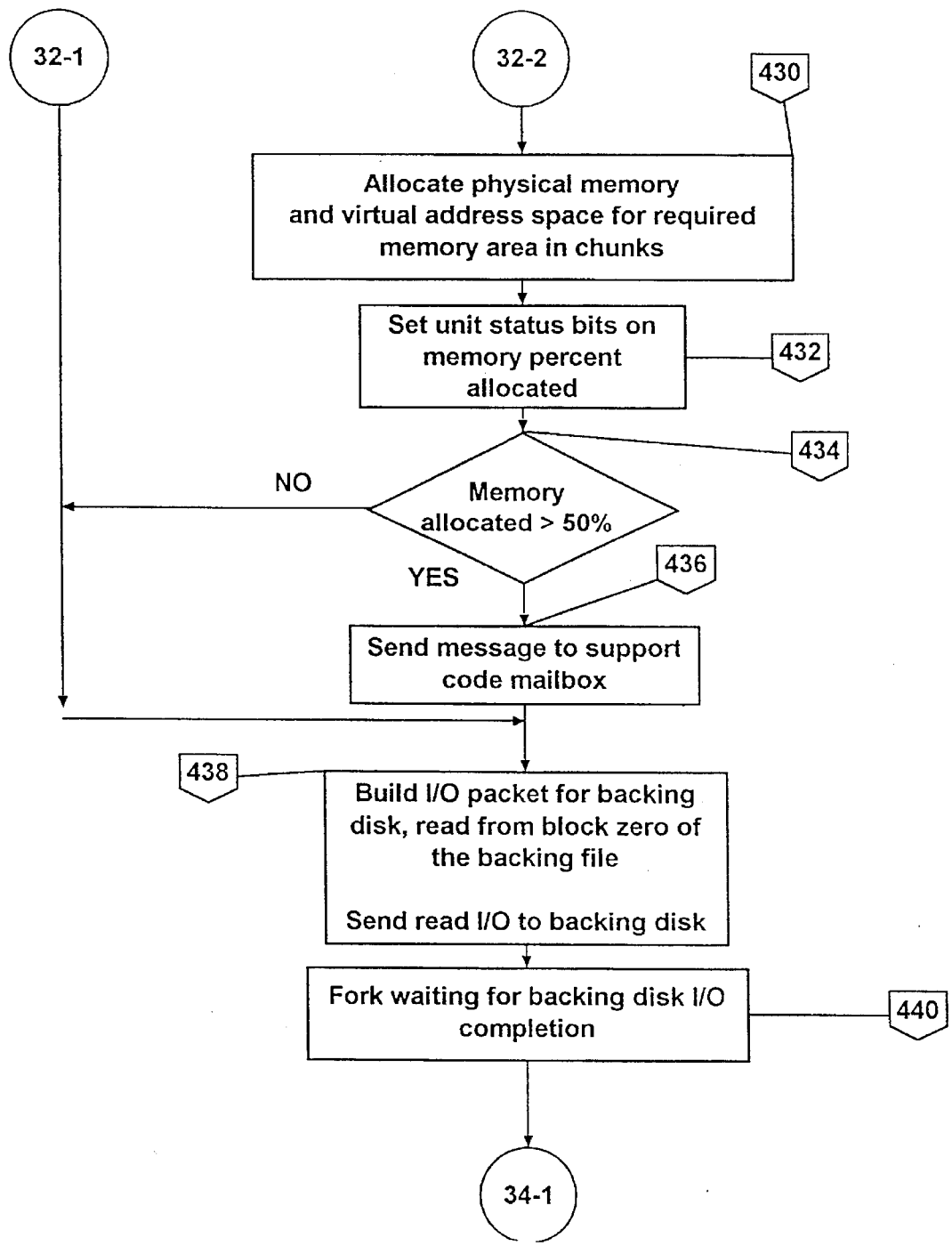
Figures 3, 7B:
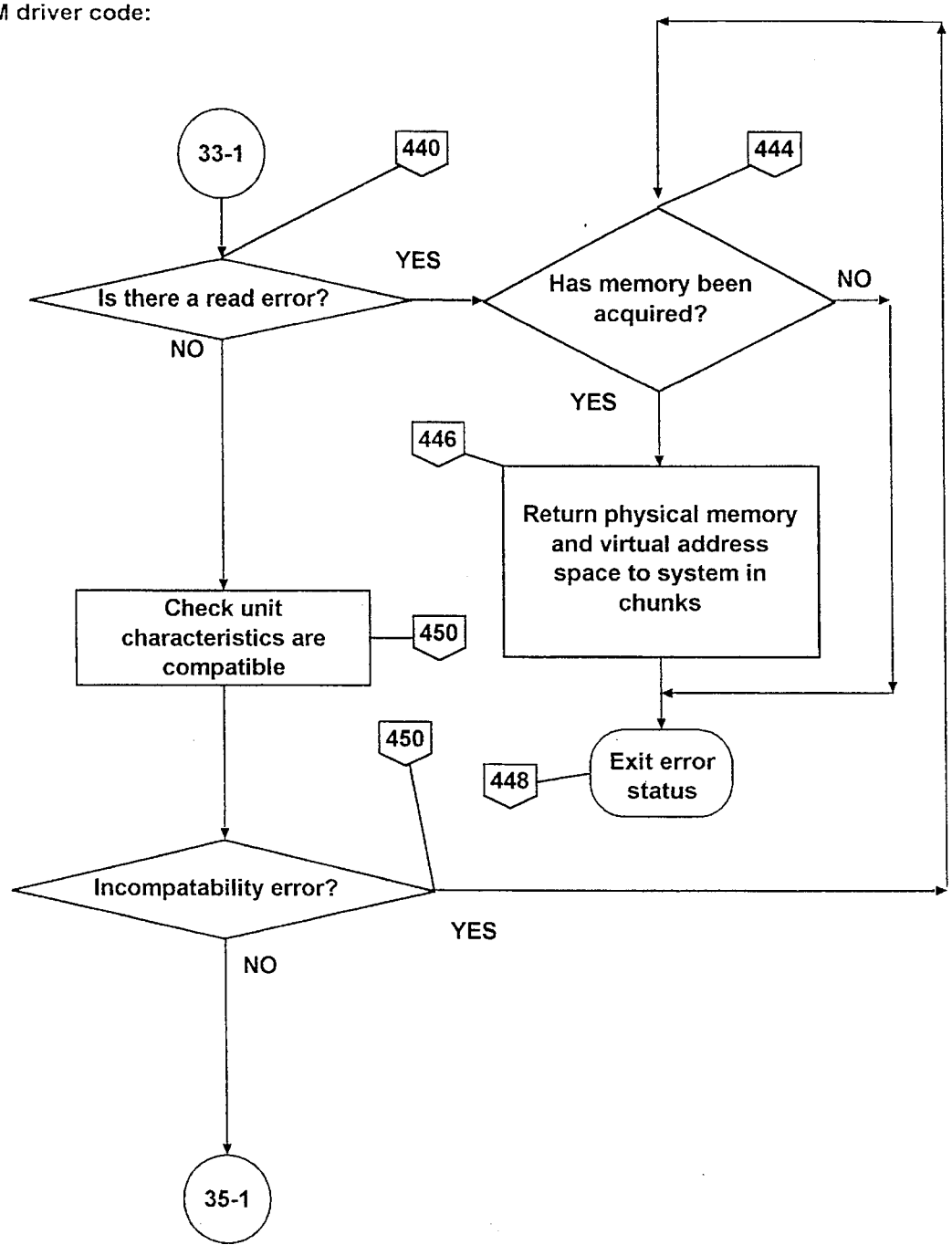
Figures 4, 7B:
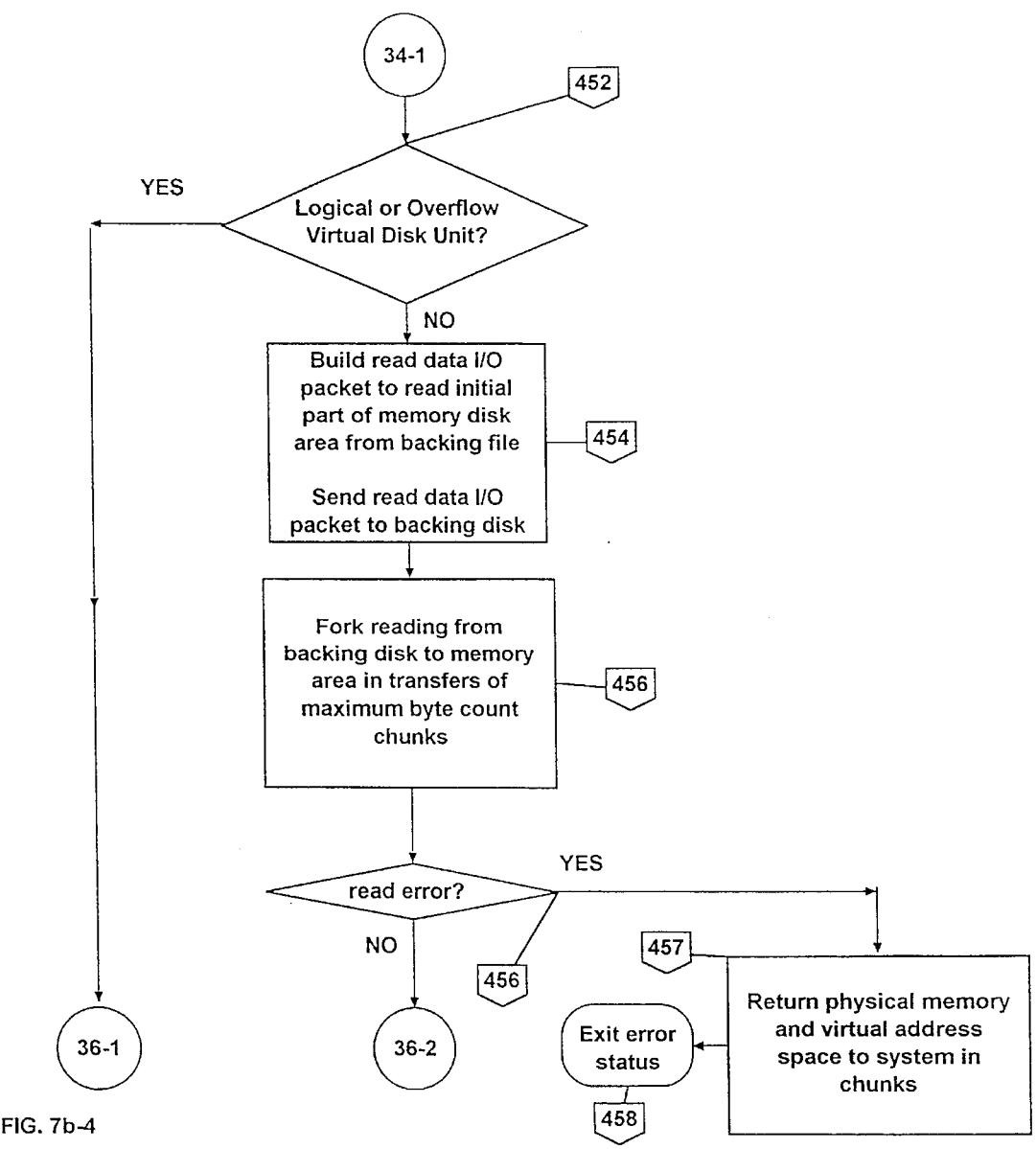
Figures 5, 7B:
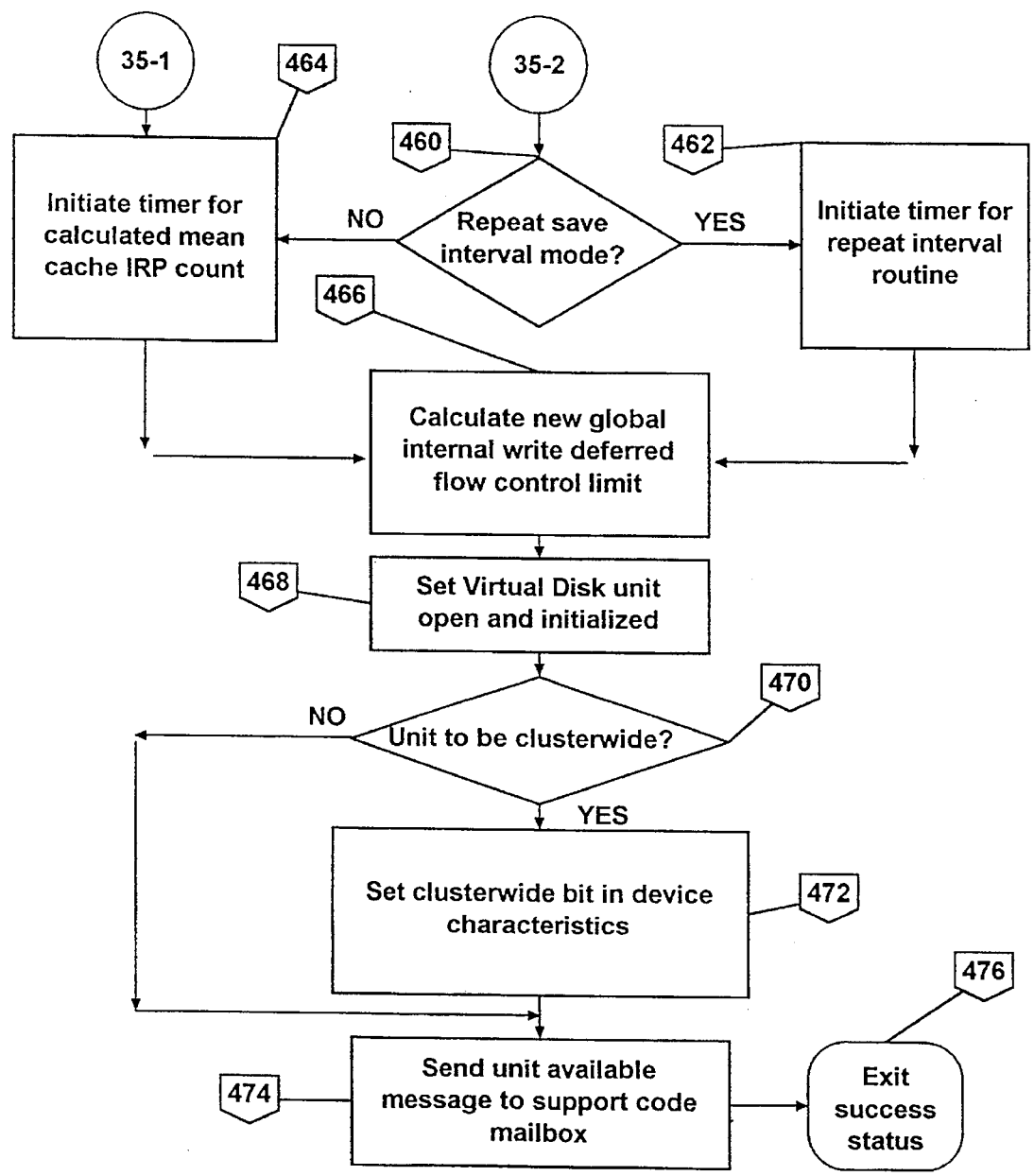

One advantage of the present invention is the ability to restore a virtual disk after a system crash, power loss, or shut down. The restore command is described in greater detail with reference to FIGS. 7a–7c. A restore command is initiated (394) by the user from the SETUNIT user interface program code (14, FIG. 1). The syntax of the command is checked (396) to make sure there is no error. If an error exists with the command, the program exits (398). The unit to be restored is configured within the OpenVMS database (400). If the device is already active, the restore command is terminated (402). The backing file description is built from the restore command and the file is located and opened on the backing disk (404). If the file does not exist or there is an error opening the file the program exits (406). The virtual disk unit being restored has its unit characteristics contained in block zero of the file, placed there when the unit was first created. The virtual disk unit characteristics are read from the backing file (408). A set-up buffer block (16, FIG. 1) is built from the unit characteristics read from the backing file and this set-up buffer block is sent to the VM driver (410). When the VM driver receives the set-up command (412), restoration continues in the control of the VM driver. The set-up buffer block is parsed (414) to detect any errors in the command. If an error exists, the program exits (4]6). The backing disk status is checked (418) and if there is an error, the program exits (420). The required number of cached IRPs specified in the set-up buffer block are allocated to the cache of IRPs from OpenVMS (422). The value for the number of cached IRPs required came from the recorded unit characteristics read from the backing file in the instruction block 408 and were originally recorded there when the unit was first created. Referring now to FIG. 7b, the program checks to see whether any RAM memory is required as specified in the set-up buffer block (424). The present preferred embodiment of the invention allows for a virtual disk to contain no RAM at all, but to be fully resident on a physical hard disk. These virtual disk units are referred to as logical disk units by the present preferred embodiment of the invention. If the virtual disk requires RAM space in the system, the program checks the size request in the set-up buffer against available free space in the system (426). If there is insufficient free memory space in the system the program exits (428). The required memory for the virtual disk device being restored is allocated (430) in chunks. Status bits are set in the virtual disk unit status (46, FIG. 1) to indicate how much RAM has been used of the available computer memory (432). If the allocation is greater than 50% of that available (434), an appropriate message (436) is sent to the support code mailbox (34, FIG. 1) in order to inform the OpenVMS system operator. The program builds an I/O packet to read the virtual disk unit characteristics from block 0 of the backing file and sends the read I/O command packet to the backing disk (438). This read I/O from the backing disk is performed to verify that the virtual disk can access the backing disk and as a double check against the unit characteristics recorded in the backing file for the virtual disk being restored. The program waits for the read I/O to complete from the backing disk (440). If an error occurred with the read I/O, then if RAM was acquired (444) it is returned in chunks (446) to the system and the program exits (448). The program checks the unit characteristics recorded in the backing file are compatible (450) with the virtual disk unit being restored. If not, the program exits in error returning any RAM to the system as necessary (444–448).

Referring now to FIG. 7c, the program now checks to see if the virtual disk unit being restored is either a logical disk unit or an overflow disk unit (452), as these virtual disk unit types do not contain RAM backed up by the backing disk. If the virtual disk is not a logical disk or overflow disk type of unit, the program builds an I/O packet to read a chunk of the data contents from the backing disk (454) to the RAM and sends the read I/O packet to the backing disk. The program reads the data in chunks equivalent to the maximum byte count transfer of the backing disk (4–6) to expedite the process. If there was an error in the read (456) the program returns the RAM acquired back to the system (457) and then exits (458). If the virtual disk being restored is specified as a repeat save interval unit (460), an OpenVMS system timer is initiated (462) for timing the repeat intervals. If the virtual disk is not a save interval unit, an OpenVMS system timer will be initiated (464) for repeatedly causing the calculation of the mean cache IRP count. A new global internal write deferred flow control limit is calculated (466). This global internal write deferred flow control limit is shared by all virtual disks operating as write deferred units on the system and is adjusted whenever any virtual disk is created or dissolved. The virtual disk unit is set open and initialized (468) in its units status (467, FIG. 1) If the virtual disk unit is to be made available across a VMScluster (470) of OpenVMS systems, the clusterwide bit in the device characteristics is set (472) allowing this virtual disk unit to be found and served to a VMScluster by the OpenVMS MSCP server system A unit available message is sent (474) to the support code mailbox (34, FIG. 1), causing the support code to open a channel (32, FIG. 1) on the backing file. That completes the restoration of the virtual disk successfully (476). The OpenVMS system now considers the virtual disk as another available disk drive in which to read or write. Important here in relation to the invention is that a virtual disk with its RAM backed by a backing disk, will contain the data up to the last backup write of the unit before the system crash, power outage, or shut down.

Figures 1, 8:
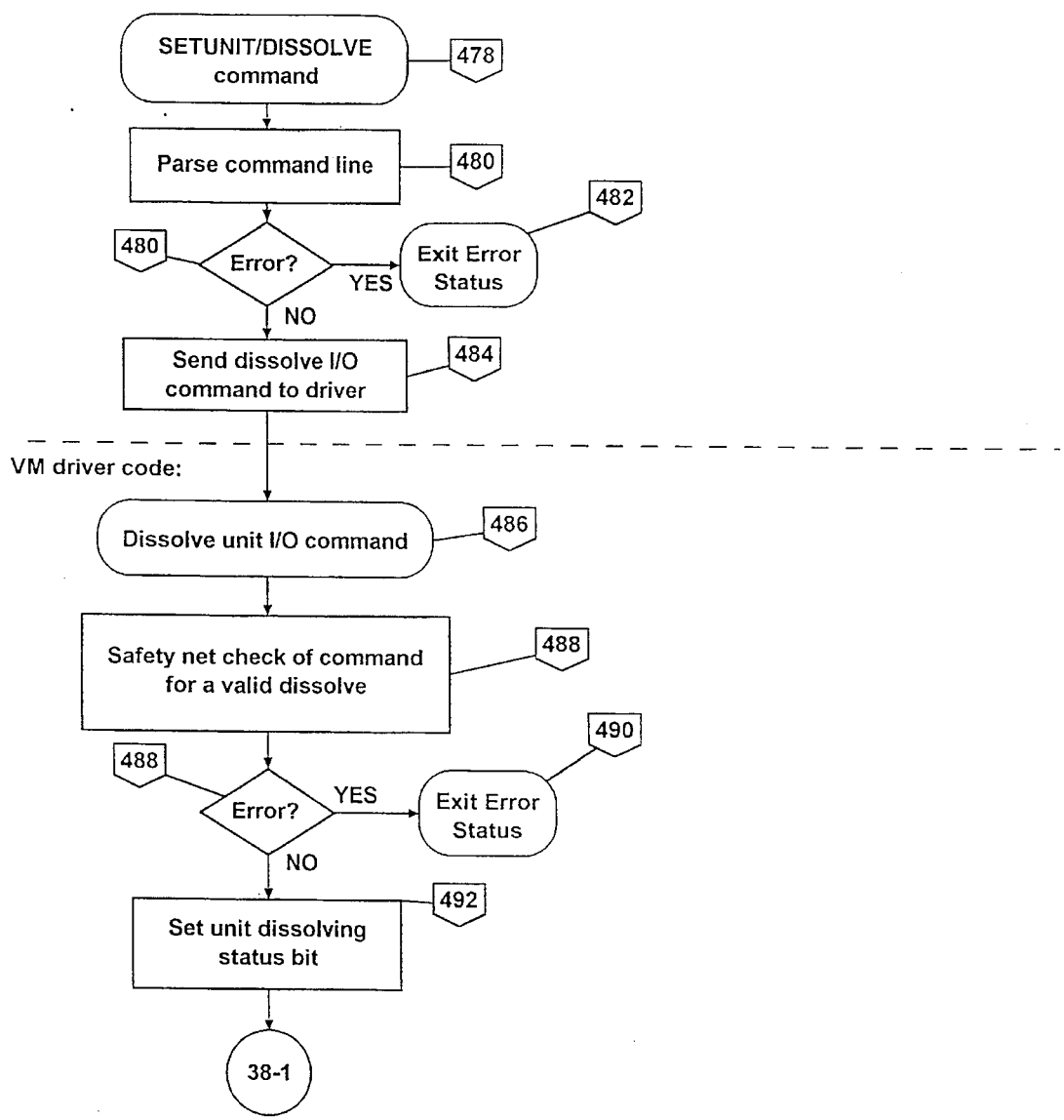
FIG. 8 is a flow diagram of the program steps for dissolving a virtual disk of the invention.
Figures 2, 8:
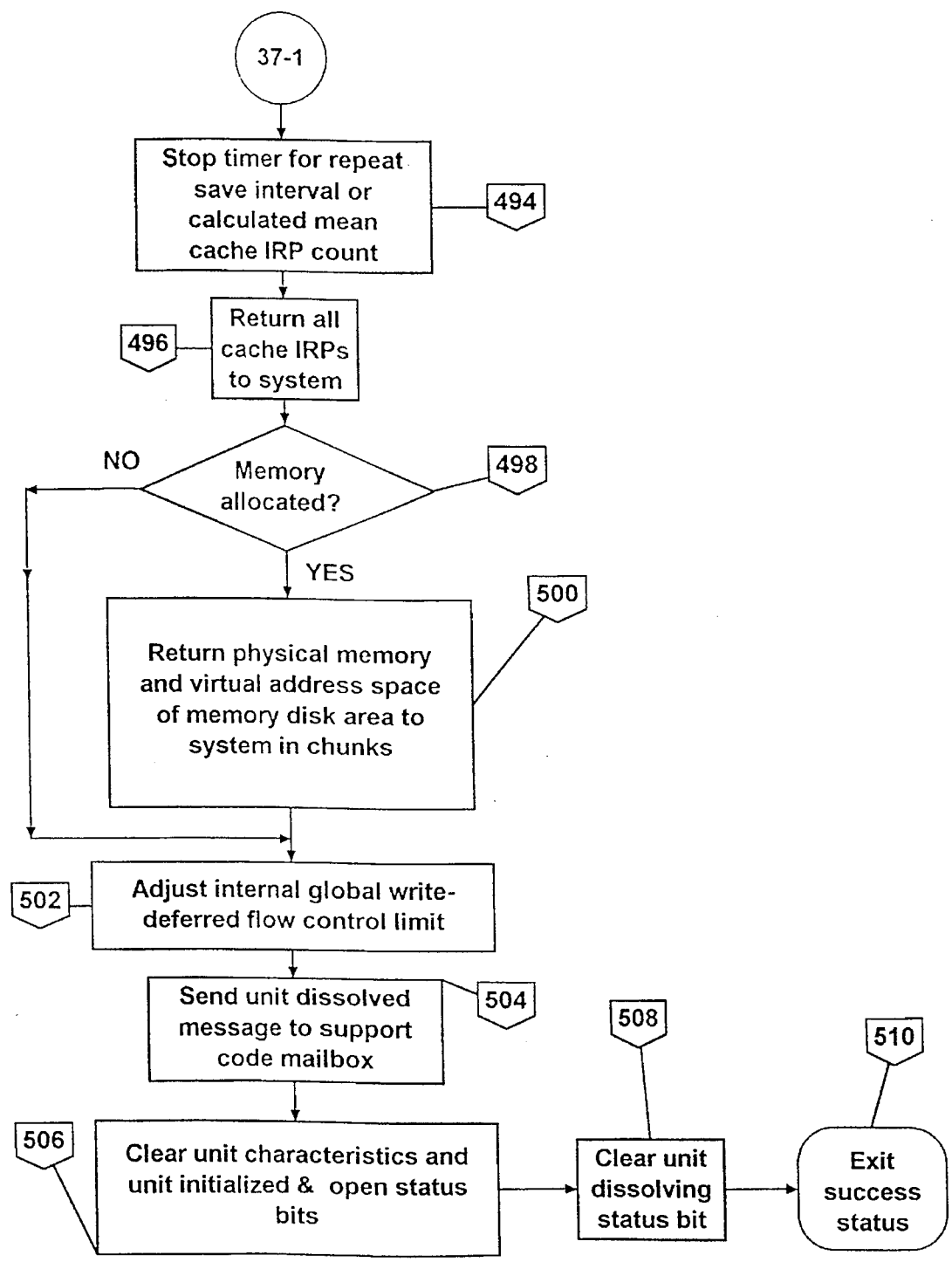

It may be desirable at times to dissolve a unit that is no longer needed. The flow diagrams for code which performs this function is shown and described with respect to FIG. 8. The dissolve command is issued by a user (478) using the SETUNIT command interface code (14, FIG. 1). The command is parsed (480) and any error detected causes an exit from the code (482). A dissolve command is sent from the user interface code to the VM driver code (484). Upon receiving the dissolve command (486), the VM driver performs a safety net check of the command to determine whether the command is a valid dissolve (488). If not, the program exits at this point (490). The unit dissolving status bit is set (492) in the virtual disk unit status (46, FIG. 1). Any timers for the repeat save interval or calculate mean cache IRP count are stopped (494). All cached IRPs are returned back to the OpenVMS system (496). A check is made to see whether this virtual disk unit has any RAM allocated (498). If the virtual disk unit does have RAM allocated, all this RAM is returned to the system in chunks (500). The internal global write deferred flow control limit is adjusted (502) as the system now has more pool and memory available, allowing any virtual disk units operating in write deferred mode to use more IRPs from the system in their cache of IRPs for cloning I/O packets on write data transfers to the backing disk. A unit dissolved message is sent (504) to the support code mailbox (34, FIG. 1). On receipt of the unit dissolved message the support code will close the channel (32, FIG. 1) it possibly had open to the backing file. As this present preferred embodiment of the invention operates with the OpenVMS system, the features of the OpenVMS system prevent the virtual disk unit name from being removed from the list of available I/O devices on the system. To prevent use of this virtual disk unit name from any further operations apart from a recreate of the named unit by a create unit command (48, FIG. 2a) or a restore unit command (394, FIG. 7a), the virtual disk unit characteristics are cleared (506) along with clearing the unit initialized and open status bits in the virtual disk unit status (46, FIG. 1). The unit dissolving status bit is cleared (508) in the virtual disk unit status (46, FIG. 1). The dissolve is then complete (510).

The embodiment of the present invention is intended to be merely exemplary and those skilled in the art shall be able to make numerous variations and modifications to it without departing from the spirit of the present invention. For example, the invention may be implemented on operating systems other than the OpenVMS system. All such variations and modifications are intended to be within the scope of the present invention as defined in the appended claims.

We claim:

1. A method for implementing a software virtual disk on a computer system comprising the steps of:
   (a) creating a structure in RAM for acting as a virtual disk;
   (b) designating the structure in RAM as a write through unit;
   (c) allocating a plurality of IRP's to a cache;
   (d) initiating an I/O write of data to the structure in RAM;
   (e) identifying the structure in RAM as a write through unit;
   (f) cloning the data into one of the IRP's to form a cloned I/O data packet;
   (g) writing the cloned I/O data packet to a backing disk in response to identification of the structure as a write through unit;
   (h) after writing the cloned I/O data packet to a backing disk, returning said one of the IRP's to the cache;
   (i) writing the data into the structure in RAM; and
   (j) signalling completion of the I/O write upon completion of steps (g) and (i).

2. A method for implementing a software virtual disk on a computer system comprising the steps of:
   creating a structure in RAM for acting as a virtual disk;
   designating the structure in RAM as a write deferred unit;
   allocating a plurality of IRP's to a cache;
   initiating an I/O write of data to the structure in RAM;
   identifying the structure in RAM as a write deferred unit;
   cloning the data into one of the IRP's to form a cloned I/O data packet;
   writing the data into the structure in RAM;
   signalling completion of the I/O write upon writing the data into the structure in RAM;
   writing the cloned I/O data packet to a backing disk; and
   returning said one of the IRP's to the cache.

3. The method of claim 2 further comprising the steps of detecting an error characterized by an inability to correctly write the cloned I/O packet to the backing disk and disabling write deferral in response to said error.

4. A programmed computer providing a virtual disk capability, said computer being connected to a network of computers and comprising:
   a plurality of memory disks;
   an operating system for communicating with said plurality of memory disks and for providing the computers on the network with access to said memory disks;
   RAM in communication with said operating system;
   means for creating a structure in said RAM that acts as a virtual disk available to said operating system over said network and wherein said operating system communicates with the virtual disk as if it were one of said memory disks;
   a network availability indicator for allowing the virtual disk to be found and served over the network through said operating system;
   means for creating a backing file in one of said memory disks for the virtual disk; and
   means, responsive to an I/O write of data to the virtual disk, for writing the data into the virtual disk and the backing file.

5. The programmed computer of claim 4 wherein said means for writing comprises an algorithm initiated by an I/O write of data to the virtual disk to identify the structure in RAM as a write through unit, to clone the data to create a cloned I/O data packet, to write the cloned I/O data packet to the backing file, to write the data into the structure in RAM and to signal to said operating system completion of the I/O write upon completing the write to the backing file and the write to the structure in RAM.

6. The programmed computer of claim 4 wherein said means for writing comprises an algorithm initiated by an I/O write of data to the virtual disk to identify the structure in RAM as a write deferred unit, to clone the data to create a cloned I/O data packet, to write the data into the structure in RAM, to signal to said operating system completion of the I/O write upon writing the data into the structure in RAM and to write the cloned I/O data packet to the backing file.

7. A storage medium encoded with a program which when loaded into a digital computer having an operating system provides said computer with a virtual disk capability wherein said program comprises the steps of:

creating a structure in RAM for acting as a virtual disk;

designating the structure in RAM as a write deferred unit;

allocating a plurality of IRP's to a cache;

initiating an I/O write of data to the structure in RAM;

identifying the structure in RAM as a write deferred unit;

cloning the data into one of the IRP's to form a cloned I/O data packet;

writing the data into the structure in RAM;

signaling completion of the I/O write upon writing the data into the structure in RAM;

writing the cloned I/O data packet to a backing disk; and thereafter returning said one of the IRP's to the cache.

8. The method of claim 2 further comprising the step of periodically calculating an amount of IRP usage and returning IRP's from the cache to the operating system that exceed the calculated amount.

9. The method of claim 2 further comprising checking for IRP pool expansion failures in the operating system.

10. The method of claim 2 wherein the computer system is connected to a network of computers and further comprising the step of designating the structure in RAM as being available over the network.

11. The programmed computer of claim 4 further comprising support code for opening a channel to the backing file when the virtual disk is mounted for data access from said operating system.

12. The programmed computer of claim 11 wherein said support code further includes means for closing the channel when the virtual disk is dismounted from access or is dissolved.

13. The programmed computer of claim 6 further comprising a cache of IRP's and wherein said means for writing creates a cloned I/O packet by cloning the data into one of the IRP's in said cache.

14. The programmed computer of claim 13 further comprising means for periodically calculating an amount of IRP usage and returning IRP's from the cache to the operating system that exceed the calculated amount.

15. The programmed computer of claim 13 further comprising means for checking for IRP pool expansion failures in the operating system.

16. The storage medium of claim 7 wherein said program further comprises the step of periodically calculating an amount of IRP usage and returning IRP's from the cache to the operating system that exceed the calculated amount.

17. The storage medium of claim 7 wherein said program further comprises checking for IRP pool expansion failures in the operating system.

18. The storage medium of claim 7 wherein said program further comprises a step of designating the structure in RAM as being available over a network.

19. The method of claim 1 wherein the computer system is connected to a network and further comprising designating the structure in RAM as being available over the network and wherein said step of initiating an I/O write takes place over the network.

* * * * *